April 16, 1946.   A. NELSON   2,398,550
CLENCHING APPARATUS
Filed March 15, 1944   10 Sheets-Sheet 2

Inventor:
Albert Nelson
By Wallace and Cannon
Attorneys

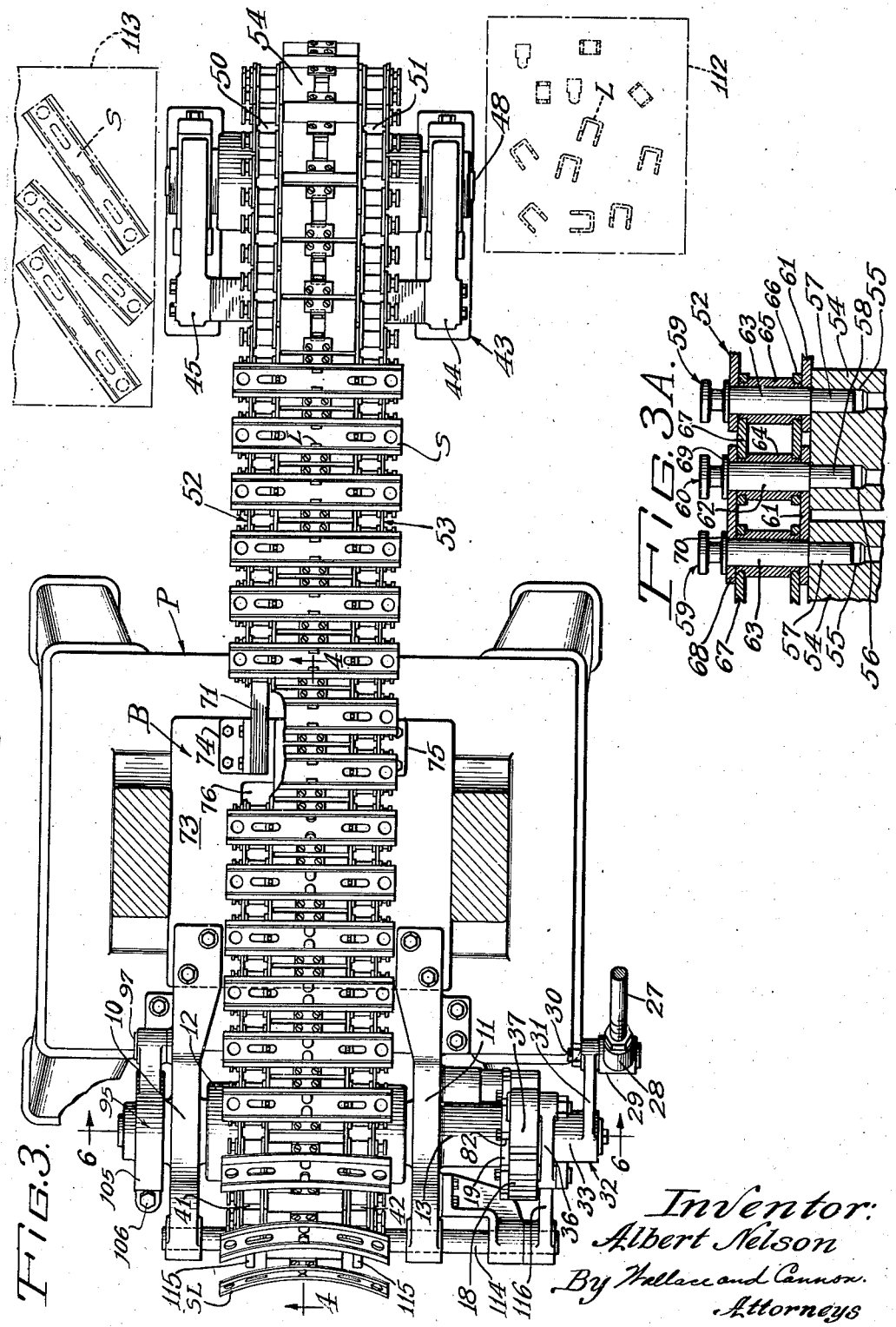

April 16, 1946. A. NELSON 2,398,550
CLENCHING APPARATUS
Filed March 15, 1944 10 Sheets-Sheet 4
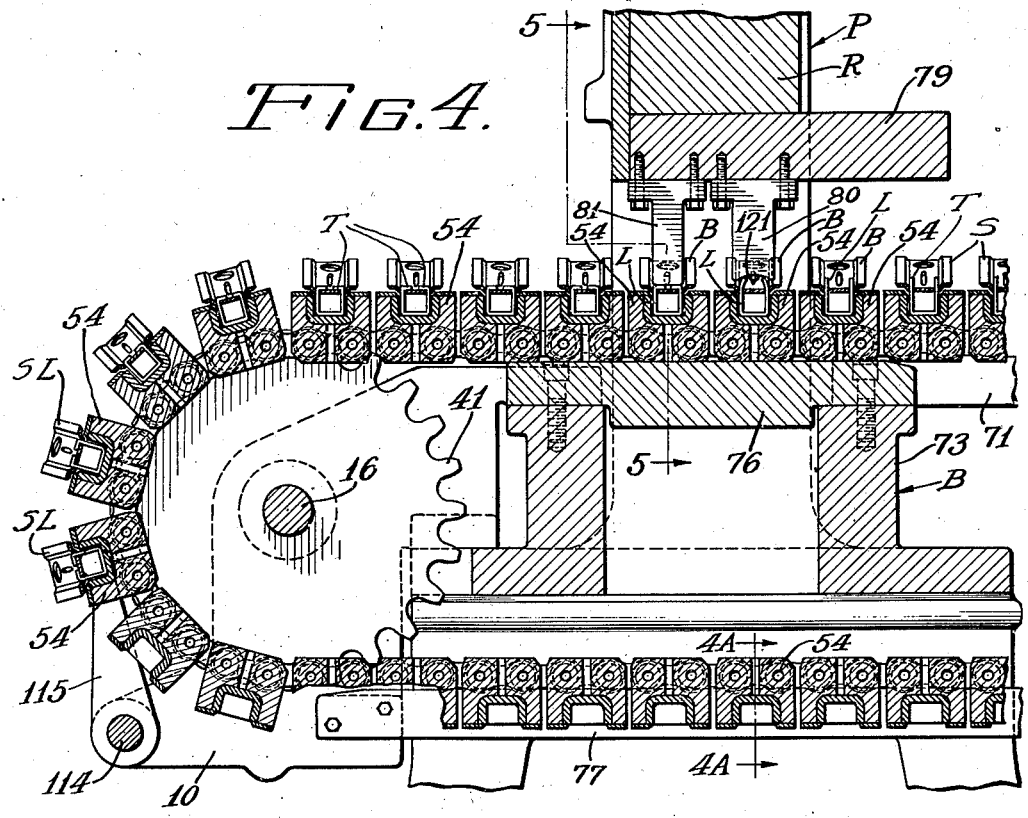
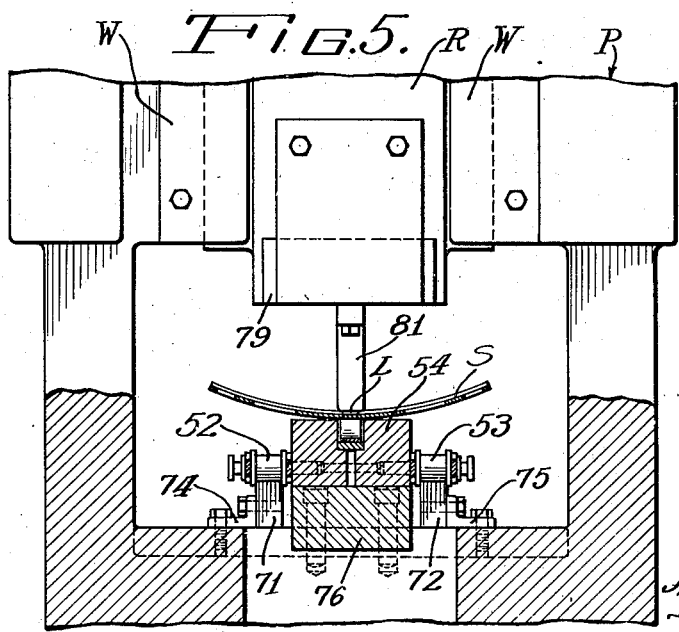
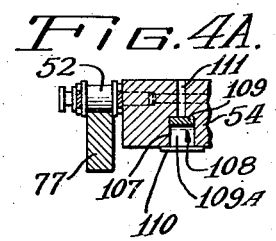
Inventor:
Albert Nelson
By Wallace and Connor
Attorneys April 16, 1946.  A. NELSON  2,398,550
CLENCHING APPARATUS
Filed March 15, 1944   10 Sheets-Sheet 5
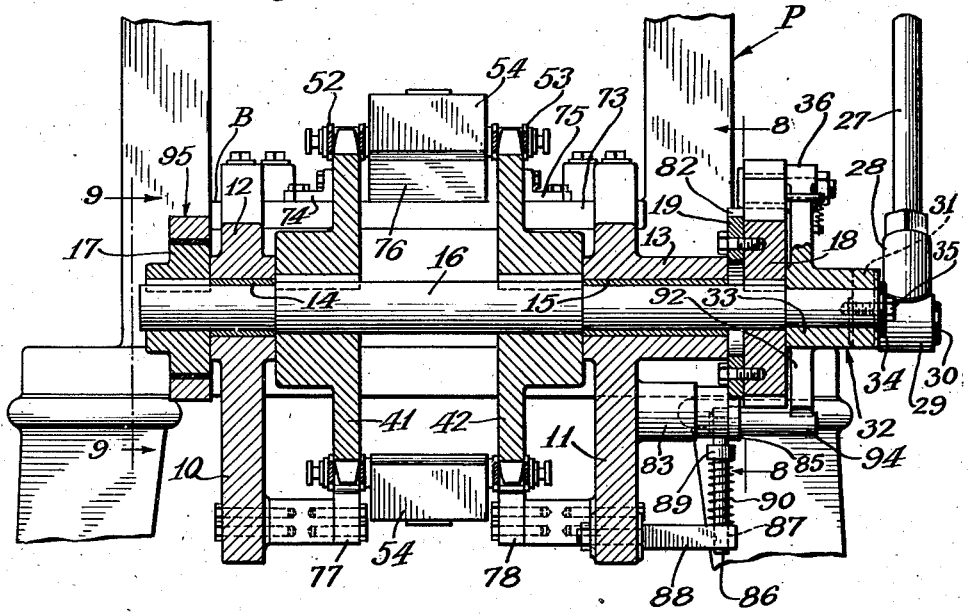
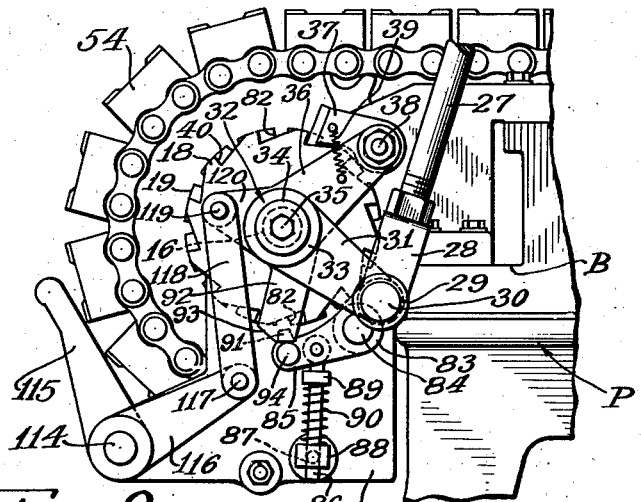
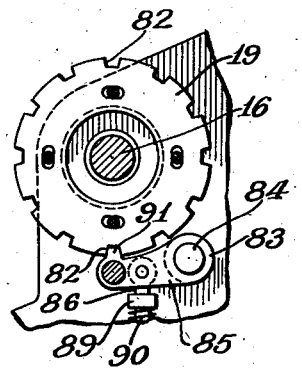
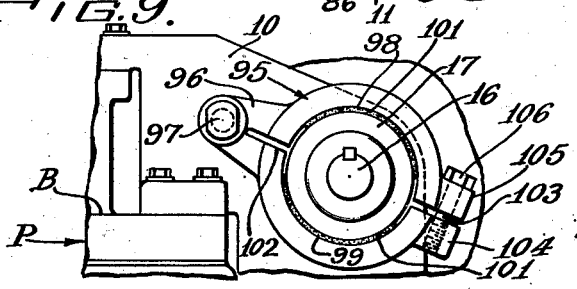
Inventor:
Albert Nelson
By Wallace and Cannon.
Attorneys

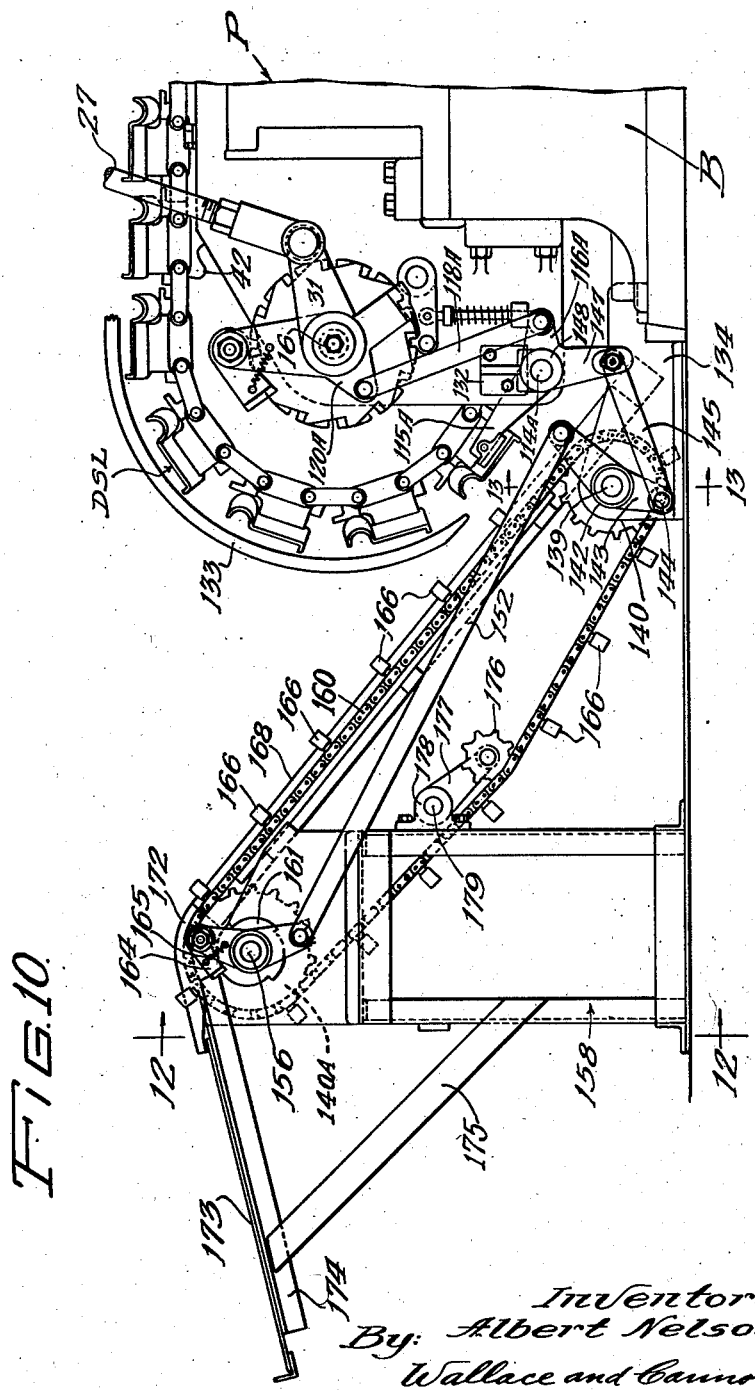

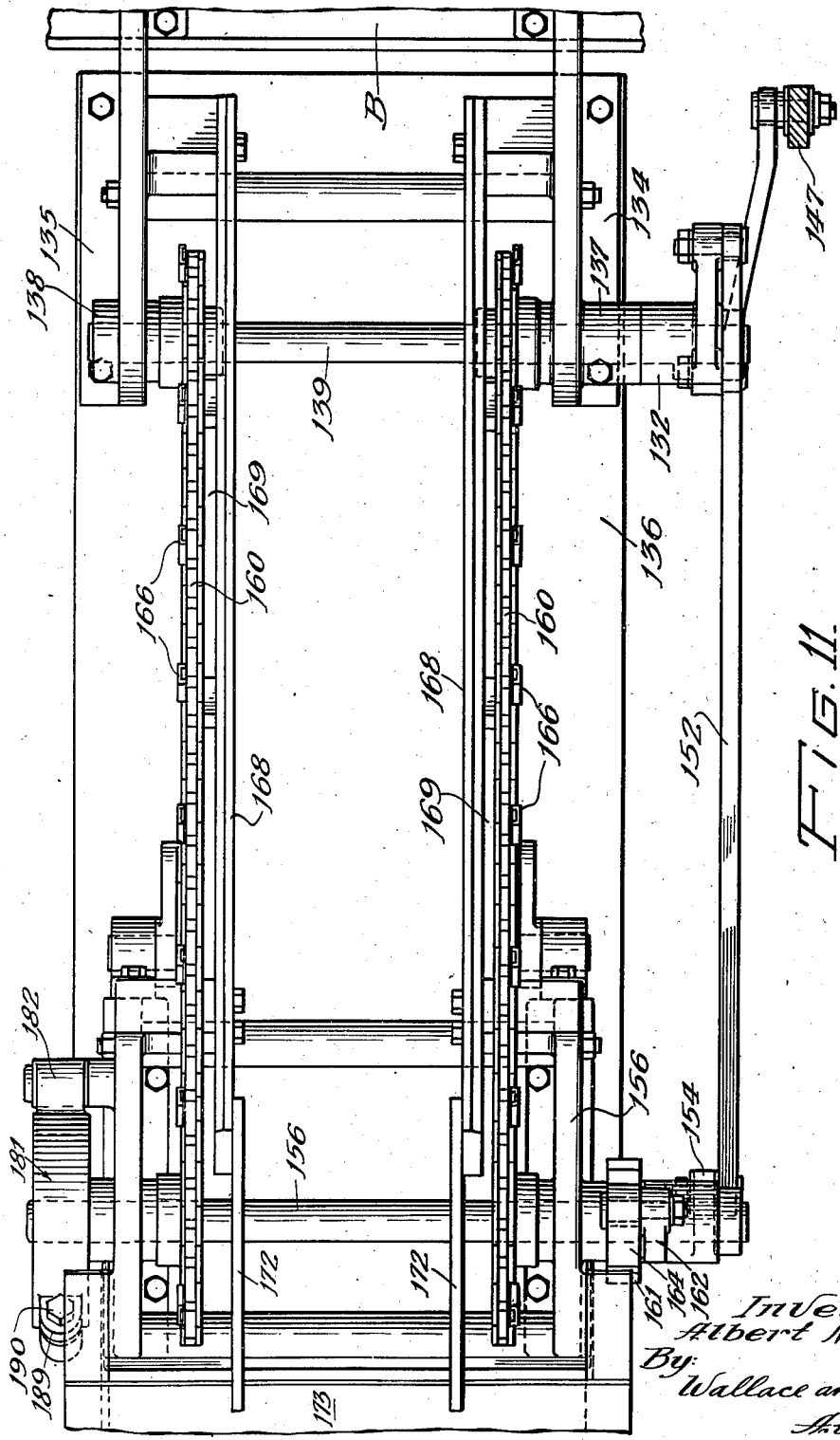

April 16, 1946.     A. NELSON     2,398,550
CLENCHING APPARATUS
Filed March 15, 1944     10 Sheets-Sheet 8
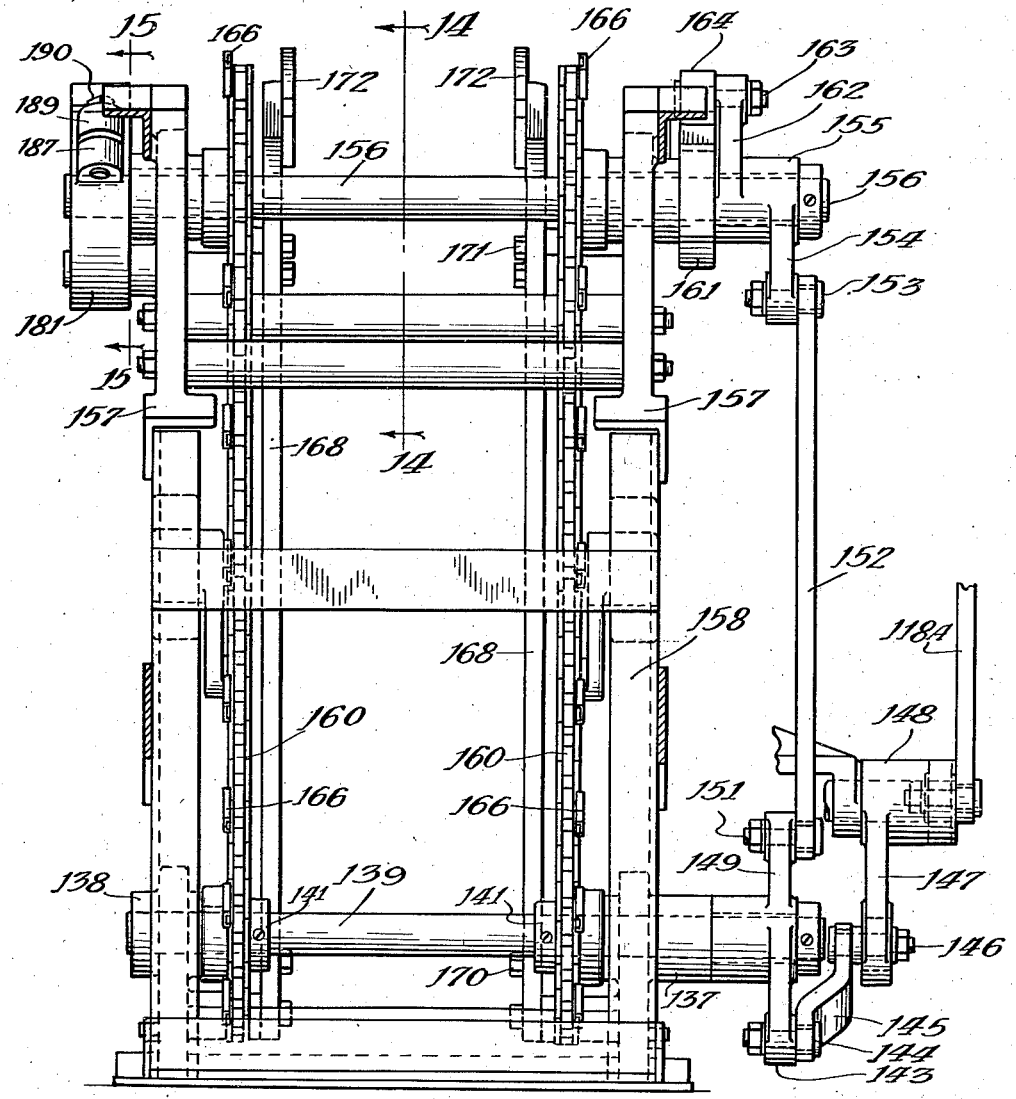

April 16, 1946.  A. NELSON  2,398,550
CLENCHING APPARATUS
Filed March 15, 1944  10 Sheets-Sheet 9
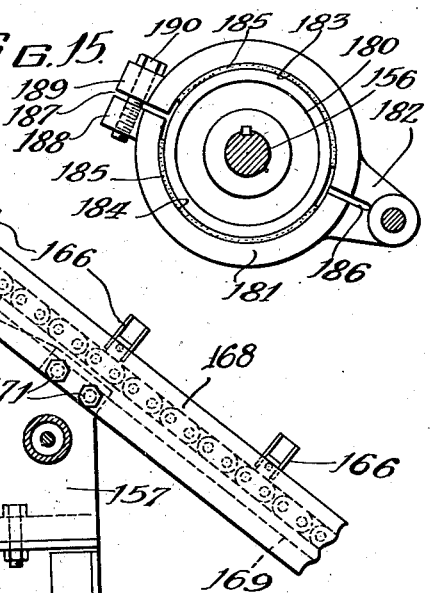
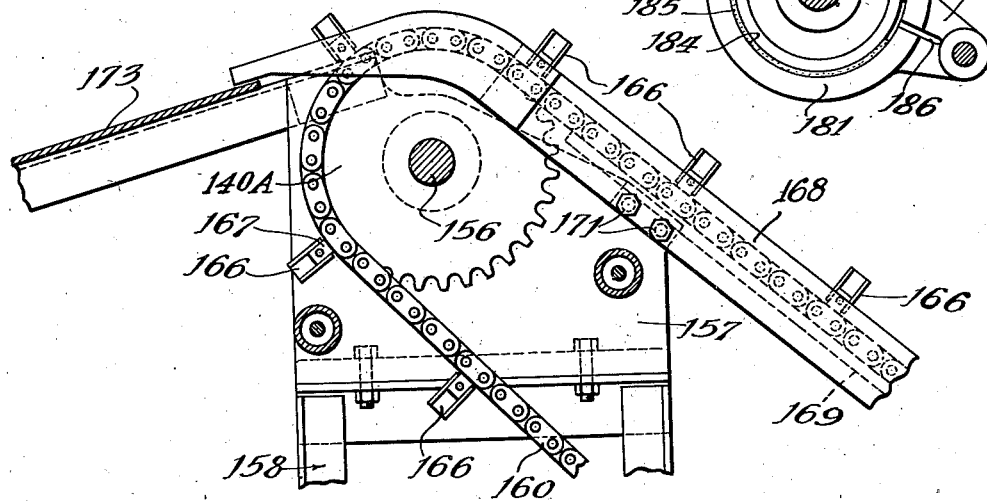
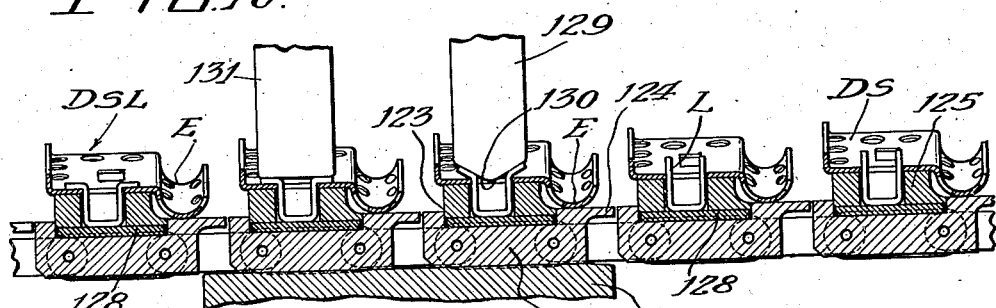
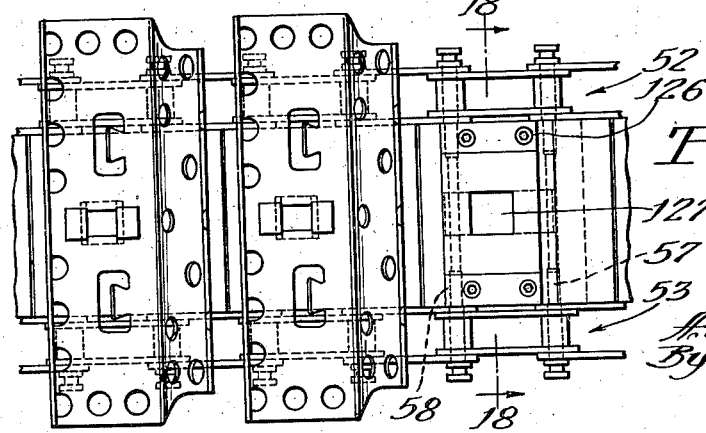
Inventor:
Albert Nelson
By Wallace and Cannon
Attorneys April 16, 1946.        A. NELSON        2,398,550
CLENCHING APPARATUS
Filed March 15, 1944        10 Sheets-Sheet 10

Inventor:
Albert Nelson
By Wallace and Cannon
Attorney

Patented Apr. 16, 1946

2,398,550

UNITED STATES PATENT OFFICE 2,398,550

CLENCHING APPARATUS

Albert Nelson, Chicago, Ill., assignor to American Brake Shoe Company, Wilmington, Del., a corporation of Delaware Application March 15, 1944, Serial No. 526,645

19 Claims. (Cl. 153—21)

This invention relates to clenching apparatus of the character employed in assembling operations to firmly clench or clamp at least one part upon another.

There are many instances where one or more parts are clamped upon another part in the assembly of various devices. Usually certain of the parts are equipped with tongues or the like that are passed through openings in other parts so as to thereby bring shoulders on the parts including the tongues or the like into engagement with one of the faces of the other parts and thereafter the tongues or the like are clamped onto the other faces of such parts so as to thereby firmly unite the parts in assembled relation. Typical instances in which such operations are performed is in the assembly of the attaching lugs onto the ductile metal reinforcements disclosed in the patent to Pogue No. 2,035,720, patented March 31, 1936, or in the patent to Trainer No. 1,872,850, patented August 23, 1932. Such ductile metal reinforcements are utilized in brake shoes of the character employed to effect deceleration of railway and like equipment. These reinforcements are embedded in the backs of such shoes and the lugs which are attached thereto medially thereof are at least in part surrounded by the body metal of the shoes so as to thereby afford what are known as center attaching lugs which are utilized in securing shoes of this character in operative position in the brake rigging of railway and like equipment. Inasmuch as such shoes and therefore the reinforcements included therein are subjected to vibration and other forces in the course of use thereof, it is essential that the lugs be firmly secured to the reinforcements so as to prevent such relative movement between the lugs and the reinforcements as might be detrimental in the course of use of the shoes in which the reinforcements are included in the customary manner.

Heretofore lugs have been secured to reinforcements of the aforesaid character through the utilization of a punch press and the initial assembly operation and control of the punch press has been effected manually. Thus, for example, a die block has been provided in the punch press and a lug to be clenched to a reinforcement has been dropped into an opening in the die block with the tongues at the free ends of the lug extended upwardly. Thereafter the reinforcement, or steel back as it is commonly known, has been disposed in position to have the tongues extended through appropriate openings therein and thereupon the punch press was set in operation and a forming member therein operated to bend the tongues into inclined position and extended toward or away from each other. Thereafter the lug and back were moved to another position in the press to be associated with another forming member and thereupon the press was again set in operation and this second forming member operated to bend the tongues over into engagement with the adjacent face of the reinforcement or back. While such operation has in the past proven to be satisfactory it has been relatively slow and expensive and because of the manual factor entailed there have been instances where, because of careless workmanship, proper assembly of the lugs on the backs or reinforcements has not been effected.

In view of the foregoing, it is among the primary objects of my invention to enable one or more parts to be clenched or clamped onto at least one other part in such a way as to insure that proper assembly of the parts will result and also to effect such assembly of the parts in a rapid and expeditious manner so as to thereby enable the operations to be carried out economically.

Yet other objects are to successively advance parts to be assembled together by a clamping or clenching operation to an operating means effective to perform the clamping or clenching operation; to so interrelate operation of the advancing means and the operating or clamping means as to insure that the parts to be clamped together will be brought into proper position relative to the clamping means at predetermined times in the operation of the advancing and clamping means; and to so arrange the advancing means that the parts to be clamped one to the other may be disposed thereon in such relation one with the other that operation of the clamping or clenching means thereon will bring about final assembly of the parts one on the other.

Still further objects are to advance elements of an endless conveyor in a step-by-step manner into and from operative position in a clamping or clenching means; to enable certain of the parts to be assembled to be disposed on the elements of the conveyor and to thereafter enable other parts that are to be assembled with the first-named parts to be disposed in proper relation with the parts already disposed on the elements of the conveyor; to so interrelate the operation of the clenching means and the conveyor that the clenching means may be effective on the parts disposed on elements of the conveyor during at rest intervals in the step-by-step movement of the conveyor; to so arrange the clenching means and the conveyor that initial and final operations may be effective on the parts to be assembled during at rest intervals in the step-by-step advancing of the conveyor and when elements of the conveyor and the parts carried thereby are in predetermined relation with the selected of the elements of the clenching means; to insure that the elements of the conveyor and the parts carried thereby will be accurately oriented relative to the parts of the clenching means that are to be effective thereon; to insure that movement of the conveyor will be arrested with at least selected of the elements thereof in predetermined positions each time the step-by-step movement thereof is interrupted; and to afford a novel and efficient apparatus which will enable the hereinabove recited and related objects of this invention to be realized.

Another object is to so construct and arrange an apparatus of the kind described and having an endless carrier chain or conveyor, operable in a step-by-step manner to advance assembled parts carried thereon into proper relations with associated clenching means effective to secure the parts together, that easily replaceable die blocks may be incorporated therein so as to adapt the endless carrier chain, for accommodating different kinds and sizes of assembled parts and advancing them into positions to be acted upon by the associated clenching means.

Still other objects are to simplify and facilitate the operation and use of such a clenching machine; to provide means operable in timed relation to operation of advancing means and clenching means of the kind described to receive assembled parts discharged from such apparatus and carry them step-by-step into position to be deposited upon an elevated surface so as to be located in position for easy lifting and ultimate disposition; to so interrelate the operation of the carrier chain and the means to receive assembled parts discharged therefrom that the transfer of such parts from the carrier chain to the receiver means occurs during at rest intervals in the step-by-step advancing of the carrier chain and said receiver means; and further to insure that movement of the receiver means will be arrested during the time such assembled parts are deposited thereon.

Other and further objects of the present invention will be apparent from the following description and claims and are illustrated in the accompanying drawings which, by way of illustration, show preferred embodiments and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawings:

Fig. 3 is a plan view taken substantially on the line 3—3 of Fig. 1;

Fig. 3A is a sectional detail view, drawn to an enlarged scale, with respect to the scale of Fig. 3, showing the manner in which certain elements of the conveyor are assembled;

Fig. 4 is a longitudinal sectional view taken substantially on the line 4—4 on Fig. 3;

Fig. 4A is a sectional detail view taken substantially on the line 4A—4A on Fig. 4;

Fig. 5 is a transverse sectional view taken substantially on the line 5—5 on Fig. 4;

Fig. 6 is a transverse sectional view taken substantially on the line 6—6 on Fig. 3;

Fig. 7 is a fragmentary elevational view showing certain of the parts illustrated in Fig. 1 in one of the operative positions thereof;

Figure 18:
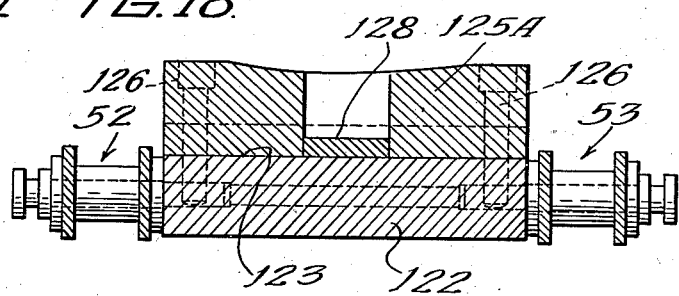
Figure 19:
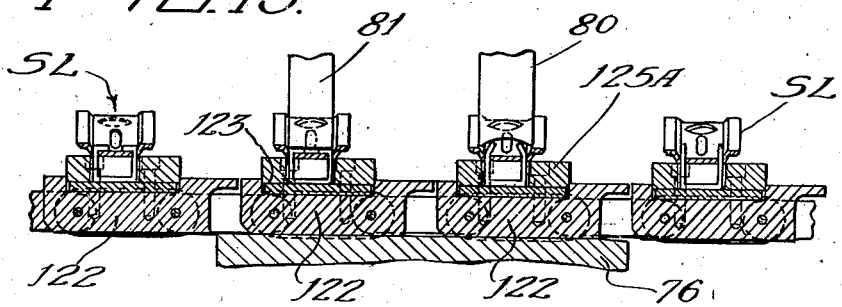
Figure 20:
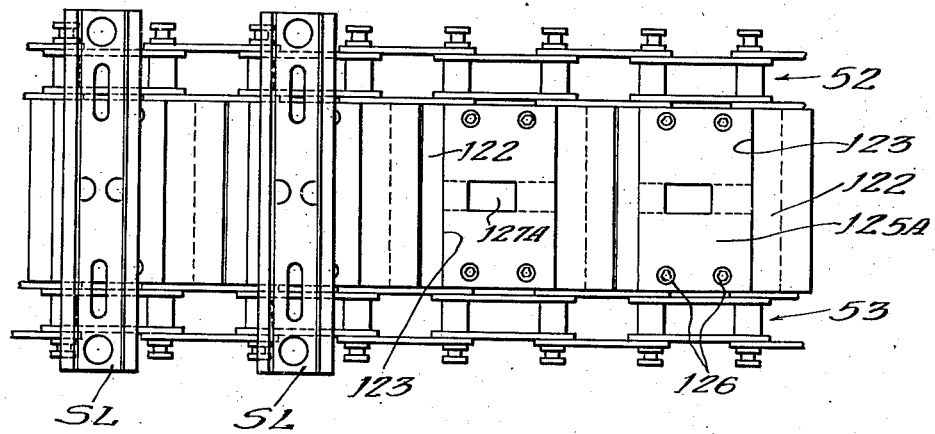

Figs. 8 and 9 are detail views taken substantially and respectively on the lines 8—8 and 9—9 on Fig. 6;

Fig. 10 is a fragmental side elevational view of an alternative embodiment of assembly apparatus wherein an elevator conveyor apparatus is associated with the discharge end of the assembly apparatus;

Fig. 11 is a plan view of the elevator conveyor apparatus illustrated in Fig. 10;

Fig. 12 is an end elevational view of the elevator conveyor apparatus, taken along line 12—12 of Fig. 10;

Fig. 13 is a transverse sectional view taken on line 13—13 of Fig. 10;

Fig. 14 is a sectional detail view taken on line 14—14 of Fig. 12;

Fig. 15 is a sectional detail view taken on line 15—15 of Fig. 12;

Fig. 16 is a longitudinal sectional detail view through a fragment of the upper flight or run of the carrier chain shown on the assembly apparatus illustrated in Fig. 10;

Fig. 17 is a fragmentary plan view of the carrier chain shown in Fig. 16;

Fig. 18 is a transverse sectional view, on an enlarged scale, through the carrier chain, taken on line 18—18 of Fig. 17;

Fig. 19 is a longitudinal sectional detail view similar to Fig. 16, showing a modified form of carrier chain construction; and Fig. 20 is a plan view of the chain fragment shown in Fig. 19.

In the embodiment of the invention illustrated in Figs. 1 to 9 of the accompanying drawings, the invention is applied to a punch press generally indicated by P which includes a bed B that is desirably supported in spaced relation with a floor or the like. Vertically extending ways W are provided in the press P and afford guides for the ram R which is driven from the crank shaft CS in the well understood manner, power being supplied to the crank shaft CS through a belt BE or the like passed about the driving pulley K fast on the crank shaft CS. Such an arrangement of a punch press is conventional, as will be understood by those skilled in the art, and in this regard it is to be understood that the novel elements of my apparatus may be utilized in connection with any suitable punch press or other means including an operative member in the nature of the ram R.

In the present instance brackets as 10 and 11 are bolted or otherwise suitably secured to the bed B of the press P to extend horizontally from and beyond one side of the bed as best shown in Fig. 3. Bearing housings 12 and 13 are respectively provided in the brackets 10 and 11 and respectively have bearing sleeves 14 and 15 (Fig. 6) included therein and in which a shaft 16 is journaled. A brake disc 17 (Figs. 6 and 9), is keyed or otherwise suitably secured to the shaft 16 outwardly of the bearing housing 12. A ratchet wheel 18 is keyed or otherwise suitably secured to the shaft 16 outwardly of the bearing housing 13 and a circular plate 19 is secured to one face of the ratchet wheel 18 so as to be disposed between this ratchet wheel and the adjacent end of the bearing housing 13. Thus the brake disc 17 and the ratchet wheel 18, together with the plate 19, are effective to prevent longitudinal movement of the shaft 16 in the bearing sleeves 14 and 15.

In the course of operation of the punch press P, a step-by-step movement is imparted to the shaft 16 and to this end a crank disc 20 (Figs. 1 and 2) is secured to the crank shaft CS outwardly of the frame of the press and at the end of the crank shaft opposite that at which the pulley K is mounted. A bearing pin 21 (Fig. 2) is eccentrically mounted in the crank disc 20 and a bearing sleeve 22 is disposed thereabout. A collar 23 is interposed between one end of the bearing sleeve 22 and the adjacent face of the crank disc 20 while a retaining washer 24, held in position, for example, by a bolt 25 mounted in the free end of the bearing pin. These are effective to prevent displacement of the bearing sleeve from the bearing pin 21 and to prevent movement of the sleeve therealong. A socket 26 is formed unitarily with the bearing sleeve 22 and one end of a link 27 is secured in this socket. The other end of the link 27 is secured in a socket 28 formed unitarily with a bearing sleeve 29 that is mounted for movement about but held against displacement from a bearing pin 30 which is mounted at the free end of the arm 31 of a rocker generally indicated by 32. This rocker includes a bearing sleeve 33 that is disposed about the shaft 16 outwardly of the ratchet wheel 18 and which is held against displacement from the shaft by a retaining disc 34 secured in position by the bolt 35 extended into the shaft. In each rotation of the crank shaft CS the crank disc 20 makes a complete revolution and this, through the link 27 and the parts to which it is connected, is effective to impart a rocking movement to the rocker 32 about the shaft 16.

Figure 1:
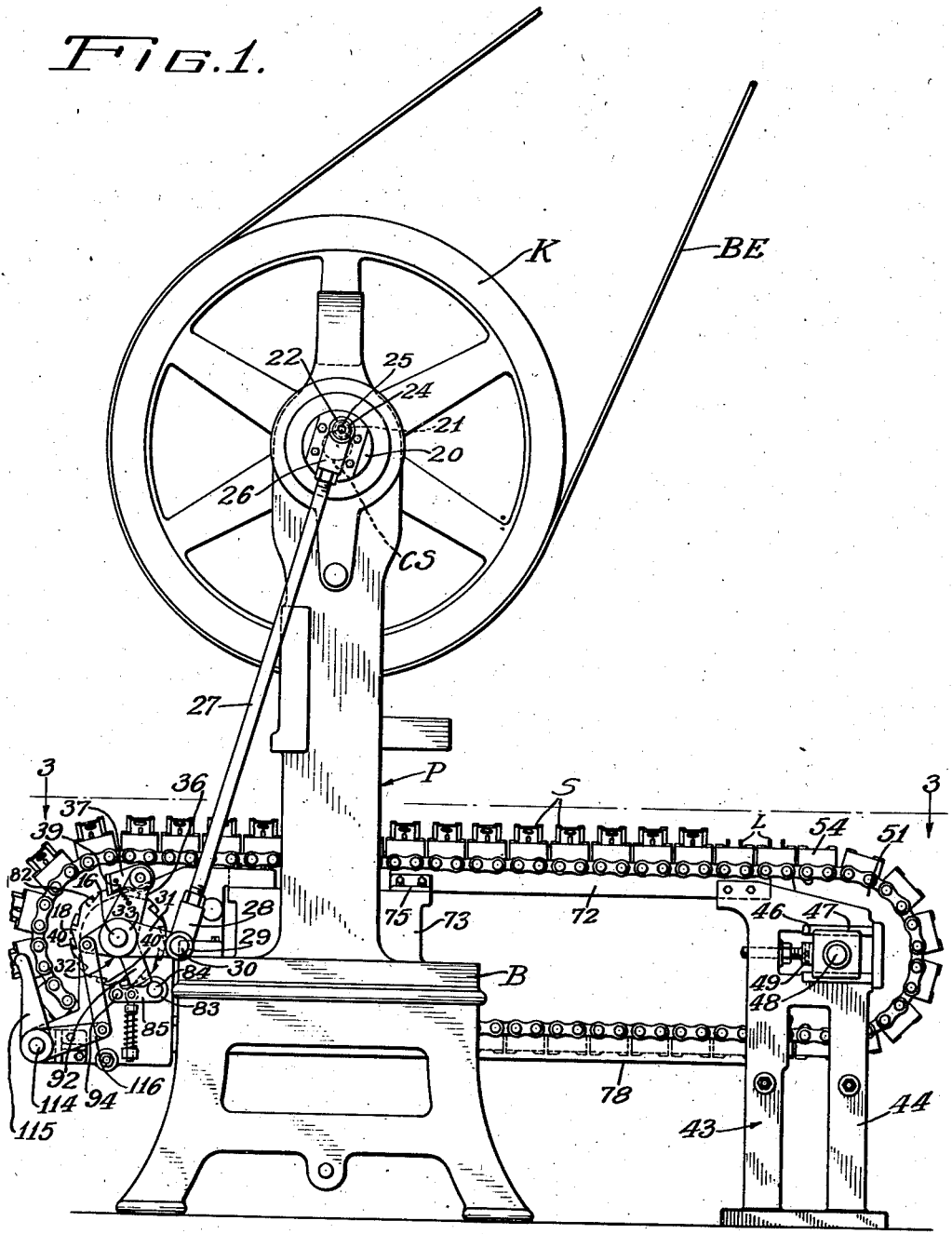
Fig. 1 is a side elevational view of a conventional punch press having the novel conveyor and related parts of my invention associated therewith.

An arm 36 projects inwardly from the bearing sleeve 33 of the rocker 32 in juxtaposition to the adjacent face of the ratchet disc 18 and this arm, as shown in Fig. 7, extends beyond the periphery of the ratchet disc. A pawl 37 is pivotally mounted, as indicated at 38, at the free end of the arm 36 and is biased toward the periphery of the ratchet disc 18 by a spring 39 extended between this pawl and the arm 36. A plurality of uniformly spaced ratchet teeth 40 are formed in the periphery of the ratchet disc 18. The reciprocating movement that is imparted to the link 27 in the course of each revolution of the crank shaft CS to thereby impart a rocking movement to the rocker 32 causes the arm 36 of this rocker to move between the two positions thereof respectively illustrated in Figs. 1 and 7. The arrangement of the parts is such that the arm 36 and pawl 37 are disposed in the positions thereof shown in Fig. 1 at the end of the movement of the arm 36 in a counterclockwise direction as viewed in Fig. 1. In this regard, the crank shaft CS and the crank disc 20 rotate in a clockwise direction as they are viewed in Fig. 1 and, therefore, movement of the crank disc 20 from the position shown in Fig. 1 is first effective to move the arm 31 of the rocker 32 downwardly from the position shown in Fig. 1 toward the position shown in Fig. 7. This is effective to retract the pawl 37 from the position shown in Fig. 1 into the position thereof shown in Fig. 7 and in the course of such movement of the pawl 37, in a counterclockwise direction as viewed in Fig. 7, this pawl is retracted from engagement with one ratchet tooth 40 into engagement with the succeeding ratchet tooth in a clockwise direction about the ratchet disc 18, as it is viewed in Figs. 1 and 7. However, after the elements attain the position thereof shown in Fig. 7 the arm 31 of the rocker 32 starts to move upwardly and this causes the pawl 37 to move from the position shown in Fig. 7 to the position shown in Fig. 1 and in the course of this movement the ratchet disc 18 is driven. Thus, so long as the crank shaft CS is in operation a step-by-step movement in a counterclockwise direction, as viewed in Fig. 7, is imparted to the shaft 16. The step-by-step movement that is thus imparted to the shaft 16 is utilized to advance the parts to be clamped together into operative position with respect to clenching elements carried by the ram R of the press P.

Thus, sprockets 41 and 42 (Fig. 6) are keyed or otherwise suitably secured to the shaft 16 immediately inwardly of the bearing sleeves 12 and 13 and endless chains 52 and 53, to be described presently, are respectively passed about these sprockets, these chains being part of the mechanism that advances the parts to be assembled together into operative position in the press P.

As best shown in Figs. 1 and 3, a stand 43 is mounted on the same support as that on which the bed B is supported and in spaced relation with the frame of the press P on the side thereof opposite from which the brackets 10 and 11 are extended. The stand 43 includes two interconnected and spaced apart uprights 44 and 45 which have ways as 46 (Fig. 1) formed therein in which bearing blocks as 47 are disposed. A shaft 48 is journaled in the bearing blocks as 47. Adjustment screws as 49 are effective on the bearing blocks 47 to force them through the ways as 46 in a direction away from the press P. Sprockets 50 and 51 (Figs. 1 and 3) are fast to the shaft 48 respectively in alignment with the sprockets 41 and 42 so that the endless chains 52 and 53 that are respectively directed about the sprockets 41 and 42 may also be respectively directed about the sprockets 50 and 51.

The parts that are to be assembled together in the apparatus illustrated in Figs. 1 to 9, inclusive, are carried into the punch press P on blocks as 54 that are disposed between and carried by the chains 52 and 53. Each block as 54 is of a width that is related to the circular pitch of the teeth of the sprockets 41—42 and 50—51 so that these blocks will pass about these sprockets in the manner shown in Figs. 1, 4 and 7.

As best shown in Fig. 3A, which is a detail view of a fragment of the chain 52 and of two of the blocks 54, two openings 55 and 56 are formed in each block 54. The shanks 57 and 58 of pins as 59 and 60 are extended into the openings 55 and 56 respectively. A link as 61 extends between the body 62 of a pin as 60 in one block 54 and the body 63 of a pin as 59 in an adjacent block as 54, this link having openings in which the pin bodies 62 and 63 are respectively pivotally mounted. A sleeve as 64 is disposed about the body 62 of a pin 60 in one block 54 and a sleeve 65 is disposed about the body 63 of the pin 59 that is extended into the same block 54. These sleeves 64 and 65 have reduced shoulders at the ends thereof and the reduced shoulders at corresponding ends of these sleeves 64 and 65 are extended into openings in a link 66 that is disposed adjacent to the rests against two links 61. Likewise the reduced shoulders at the other corresponding ends of the sleeves 64 and 65 are extended into openings in a link 67. Another link 68 extends between the pin as 60 in one block 54 and the pin as 59 in an adjacent block 54, this link 68 being disposed outwardly of the links as 67 that are connected to the respective pins 60 and 59. Shoulders as 69 and 70 are respectively provided on the pins 60 and 59 and the shanks 58 and 57 of these two pins are driven into the openings as 56 and 55 until the shoulders 69 and 70 rest against the outwardly disposed face of the link 68. An arrangement corresponding to the foregoing is provided at the opposite ends of the blocks as 54 shown in Fig. 3A to thereby interconnect these ends of these blocks. Each of the adjacent blocks 54 are interconnected as corresponding ends thereof and it is this arrangement that affords the chain 52. A similar arrangement at the other corresponding ends of the blocks as 54 serves to interconnect these blocks and affords the chain 53.

Rails as 71 and 72 (Figs. 3 and 1) extend from the stand as 43 to the die block 73 mounted on the bed B of the press, corresponding ends of these rails being connected to the die block by brackets 74 and 75 (Figs. 3, 6 and 1). The rails 71 and 72, respectively, underlie the passes of the chains 52 and 53 between the stand 43 and the press P, these rails underlying the sleeves as 64 and 65 which are so related to the bodies 62 and 63 of the pins on which they are mounted and the links 66 and 67 into which they are extended that these sleeves serve as rollers which roll on the rails 71 and 72. As best shown in Fig. 3, the rail 71 (and also the rail 72) terminates in spaced relation with an anvil 76 that is rested on the die block 73. The blocks as 54 pass onto the upper surface of this anvil 76 as the rollers as 64 and 65 ride off of the rails 71 and 72, the blocks as 54 resting on the anvil 76 when elements on the ram R are effective on parts carried by the blocks as 54 and which are to be clamped together, as will be explained. Rails as 77 and 78 (Figs. 4, 4A and 1) respectively, extend between the bracket 10 and the side frame 44 of the stand 43 and the bracket 11 and the side frame 44 of this stand. These rails 77 and 78, respectively, underlie the lower passes of the chains 52 and 53 between the sprockets 41 and 50, as best shown in Fig. 4A. Hence, the rails as 71 and 72, the anvil as 76 and the rails as 77 and 78 afford support for the chains 52 and 53 and the blocks as 54 carried thereby so as to relieve these chains of undue stress during the course of travel thereof between the sprockets about which they are respectively directed.

As shown in Fig. 4, a plate 79 is secured to the lower end of the ram of the press P and two forming or clenching elements 80 and 81 are bolted or otherwise suitably secured to the lower face of this plate. The elements 80 and 81 are spaced one from the other in an amount corresponding to the distance between the transverse center lines of adjacent blocks 54. The arrangement is such that when the chains 52 and 53 and the blocks 54, which constitute the conveyor of my novel apparatus, are brought to rest at the end of a step-by-step movement imparted to the chains from the shaft 16, which is driven in the manner hereinabove described, two blocks 54 are disposed on the upper surface of the anvil 76 and one of the blocks 54 is aligned with the element 80 while the other of the blocks 54 is aligned with the element 81. Therefore, as the ram R of the press P moves toward the blocks as 54 that are disposed on the anvil 76, the element 80 may operate on parts to be assembled that are carried on one block 54 while the element 81 may operate on parts that are to be assembled that are carried on an adjacent block 54, the manner in which these elements operate on these parts being described more fully hereinafter. Further in this regard, the crank disc 20 is so mounted on the crank shaft CS and the ram R is so connected to this crank shaft that the shaft 16 is driven in a counterclockwise direction, as viewed in Fig. 1, to thereby impart an advancing movement to the chains 51 and 52 during the time the ram R and the elements 81 and 82 are completing their movement in an upward direction and are starting their movement in a downward direction. Therefore, the chains 51 and 52 are brought to rest during downward movement of the ram R and desirably the chains come to rest immediately prior to the time the elements 81 and 82 move into operative relation with parts carried by the blocks 54 that are disposed on the anvil 76 when the chains come to rest. Hence, the elements 81 and 82 may perform their clenching function and return to an elevated position prior to the time the chains 52 and 53 are again driven from the shaft 16.

Therefore, since the elements 80 and 81 will act on parts carried by the blocks 54 disposed on the anvil 76 during an at rest interval in the step-by-step advancing of the conveyor, including the chains 52 and 53 and the blocks 54, it is important that these blocks 54, and therefore the conveyor as a whole, be brought to rest in predetermined positions accurately related to the positions of the elements 80 and 81. To this end, means are provided for effectively arresting movement of the chains 52 and 53 and the blocks 54 and therefore the shaft 16 at the end of each advancing movement imparted to these elements.

Thus, a plurality of uniformly spaced apart notches 82 (Figs. 1, 2, 3, 6, 7 and 8) are formed in the periphery of the disc 19 that is secured to the ratchet wheel 18, as described hereinabove. A bushing 83 (Figs. 6, 7 and 8) extends outwardly from the bracket 11 and a pin 84 is mounted therein on which a rocker 85 is pivotally mounted. A pin 86 is pivotally connected to the rocker 85 and is extended through an opening 87 (Figs. 6 and 7) in a plate 88 that extends outwardly from the bracket 11. A collar 89 is fast on the pin 86 and a spring 90, disposed about the pin 86 between the plate 88 and the collar 89, is effective to urge the pin 86 and therefore the rocker 85 in such direction that the tooth 91 on the rocker 85 is urged toward the periphery of the disc 19. The notches 82 in the periphery of the disc 19 are so related to the ratchet teeth 40 in the ratchet wheel 18 that when the pawl 37 attains the position thereof shown in Fig. 1, at the end of the movement thereof in one direction, which movement causes advancing of the shaft 16 and the conveyor, a notch 82 will be aligned with the tooth 91. Hence, when the conveyor comes to rest at the end of an advancing movement imparted thereto, the tooth 91 moves into a notch 82 to seat therein in the manner illustrated in Fig. 8. Such seating of the tooth 91 in a notch 82 is effective to positively arrest movement of the shaft 16 and therefore the conveyor including the chains 52 and 53 and the blocks as 54. Therefore, since the positions of the notches 82 and the tooth 91 are accurately related to the positions of the blocks as 54 along the chains 52 and 53, the seating of the tooth 91 in a notch 82 is effective to accurately orient the blocks 54 disposed on the anvil 76 relative to the elements 80 and 81.

The tooth 91 must, of course, be withdrawn from the notch 82 in which it is seated prior to the time an advancing movement is to be imparted to the ratchet wheel 18 and the shaft 16. To this end an arm 92 (Figs. 1, 6 and 7) depends from the bearing sleeve 33 of the rocker 32 and has a cam surface 93 at the lower end thereof. As best shown in Fig. 6, a stud 94 projects from the rocker 85 to be aligned with the cam surface 93 on the arm 92. When the tooth 91 is seated in a notch 82, as shown in Fig. 8, the arm 92 is disposed in the position thereof shown in Fig. 1. However, movement of the link 27 and the arm 31 downwardly to retract the pawl 37 from the position thereof shown in Fig. 1 into position thereof shown in Fig. 7, causes the tooth 91 on the rocker 85 to be retracted from the notch 82, this retraction being brought about by the action of the cam surface 93 against the effect of the spring 90. However, as the pawl 37 advances from the position thereof shown in Fig. 7 to the position thereof shown in Fig. 1, the cam surface 93 moves out of engagement with the stud 94 and upon disengagement of these elements the spring 90 is effective to urge the tooth 91 into engagement with the periphery of the disc 19 so that the tooth 91 will seat in a notch 82 when the pawl 37 attains the position thereof shown in Fig. 1, this occurring at the end of the driving movement of this pawl that is effective to advance the ratchet wheel 18 and the shaft 16.

In course of operation of the crank shaft CS and during the time the bearing pin 21 moves from the position thereof shown in Fig. 1 to a diametrically opposite position with respect to the crank disc 20, the pawl 37 is being retracted from engagement with one ratchet tooth 40 into engagement with a succeeding ratchet tooth 40. Further, during the time bearing pin 21 advances from the aforesaid diametrically opposite position to the position thereof shown in Fig. 1, a driving movement is imparted to the ratchet disc 18, the shaft 16 and the conveyor including the chains 52 and 53 and the blocks 54. The position of the bearing pin 21 on the crank disc 20 is such that the driving movement imparted through the pawl 37 attains its greatest velocity at the time the bearing pin 21 is midway between its aforesaid diametrically opposite position and the position thereof shown in Fig. 1. The result of this is that the driving movement of the pawl accelerates rather slowly during the initial part of its movement and decelerates during the final movement thereof. Particularly by reason of this deceleration, the conveyor, including the chains 52 and 53 and the blocks 54, is decelerating when the movement thereof is arrested by the tooth 91 moving into a notch 82. In fact of this, however, the tooth 91 may be subjected to a rather severe shock when it seats into a notch as 82 and it therefore becomes important to overcome the momentum of the conveyor so as to thereby relieve the stresses that might otherwise be impressed upon the tooth 91.

Therefore, a braking arrangement is associated with the shaft 16. This braking arrangement includes the brake disc 17 and what in effect is a brake drum that is generally indicated by 95, this drum being disposed about the periphery of the brake disc 17. The brake drum 95 includes a lug 96 that is pivotally mounted on the outer face of the bracket 10 as indicated at 97. The brake drum also includes two circular surfaces 98 and 99 on which blocks of suitable friction material 101 are mounted and while the brake has a slot 102 extended into the lug 96 while another slot 103 is provided therein in diametrical opposition to the slot 102, this slot 103 extending through bosses 104 and 105 provided on the drum. A bolt 106 is freely extended through an opening in the boss 105 and is screw threaded into an opening in the boss 104. By adjusting the position of the bolt 106 relative to the bosses 104 and 105 the force with which the blocks of friction material 100 and 101 are applied to the periphery of the brake disc 17 may be adjusted. This arrangement affords a constant friction drag on the shaft 16 and the conveyor including the chains 52 and 53 and the blocks 54. The force with which the friction elements 100 and 101 are applied to the periphery of the brake disc 17 is related to the momentum attained by the shaft 16 and the parts carried thereby and the conveyor including the chains 52 and 53 and the blocks 54, this relation being such that the momentum will be effectively overcome when the tooth 91 seats in a notch 92.

Hence, since movement of the conveyor is being decelerated at the time the tooth 91 is to seat in a notch 82 and by reason of the reduction of momentum of the conveyor and related parts by the action of the aforesaid braking arrangement, the tooth 91 is relieved of undue stresses when it becomes effective to arrest movement of the conveyor. Moreover, such arrangement of the apparatus insures accurate positioning of parts to be assembled relative to the clenching elements 80 and 81, such parts being carried by the blocks 54 into operative relation to these clenching elements.

In order that the parts to be assembled will be accurately positioned on the carrier blocks 54 as these are brought to rest on the anvil 76 to thereby dispose the parts in operable relation with the clenching elements 80 and 81, each carrier block 54 has an opening or pocket 107 formed medially in the upper surface thereof. Each of the pockets 107 in the carrier blocks 154 has a liner 108 frictionally fitted therein. Each of the liners 108 is preferably composed of metallic or other suitable material and includes a transverse inner or bottom wall 109, a pair of spaced side walls 109A, and a pair of flanges 110 which bear upon the wall of the carrier block adjacent the mouth of the pocket therein (Fig. 4A).

Each of the carrier blocks 54 also has a hole 111 formed therein (Fig. 4A) and each of these holes extends through the carrier block from the base or inner end of the pocket 107 therein to the surface of the carrier block which is opposite the mouth of the pocket 107. This arrangement enables the liners 108 in the pockets 107 to be removed and replaced when worn, such removal being accomplished by inserting a suitable tool, such as a punch, through the hole 111 so that the tool bears at its inner end upon the base or transverse wall 109 of the liner 108, whereupon the liner may be readily driven out of its pocket 107 and replaced by a new liner.

A stock or supply of attaching lugs L may be carried upon a suitable supporting surface such as a table 112 which is arranged at one side of the conveyor 52—53—54, adjacent the pick up or receiving end thereof, as shown in Fig. 3, and a supply of brake shoe backs S may be arranged upon a suitable support, such as a table 113, which may be arranged on the opposite side of the conveyor from the table 12 and adjacent the receiving end thereof.

This arrangement enables the workmen to place the lugs L successively in the pockets 107—108 in the carrier blocks 54 with the bight portion or transverse wall of each U-shaped lug L resting upon the bottom wall 109 of the pocket liner and with the legs of each lug projecting vertically upwardly to dispose clenching tongues T on their ends above the mouth of the pocket. The backs S may then be lifted from the supporting table 113 and placed upon the carrier blocks 54 with the convex surface of each back S facing downwardly and with the two tongues of each lug projecting upwardly through medially arranged spaced openings provided for the reception thereof in each of the backs S, as shown in Fig. 3.

It will thus be seen that as a step-by-step movement is imparted to the conveyor 52—53—54 each carrier block 54 and the assembled but unclenched back S and lug L unit carried thereby are moved into a fully at rest position upon the anvil 76, under the first clenching element 80. The ram R and the plate 79 of the press P are thereupon lowered, thus forcing the first clenching element 80 downwardly into engagement with the upwardly projecting tongues of the lug L disposed therebelow. This action of the first clenching element 80 bends the tongues of the lug L disposed therebelow inwardly toward each other, shown in Fig. 4, and to this end, and so as to facilitate the initial bending of the tongues of each lug toward each other, the bottom wall of the first clenching element 80 is preferably provided with a curved clenching surface 121 which is convex upwardly (Fig. 4).

Accordingly, as the operation of the apparatus proceeds the ram R and the plate 79 of the press P and the clenching elements 80 and 81 carried thereby are raised and the conveyor advances another step, thereby moving the thus partially clenched lug L across the anvil 76 from its initial position under the first clenching element 80 into a fully at rest position under the second clenching element 81. At the same time, the next succeeding carrier block 54 and the assembled but unclenched back S and the lug L unit carried thereby are advanced into a fully at rest position under the first clenching element 80. The ram R and plate 79 of the press P are then again lowered whereupon the second clenching element 81 engages the previously and partially bent over tongues of the lug L disposed therebelow and completes the clenching of these tongues of the lug L upon the back S assembled therewith by forcing these tongues downward into fully clenched position and in which position they lie flat upon the concave upper surface of the back S, thus completing the clenching operation and the accurate assembly of the brake shoe back S and its attaching lug L.

Figure 2:
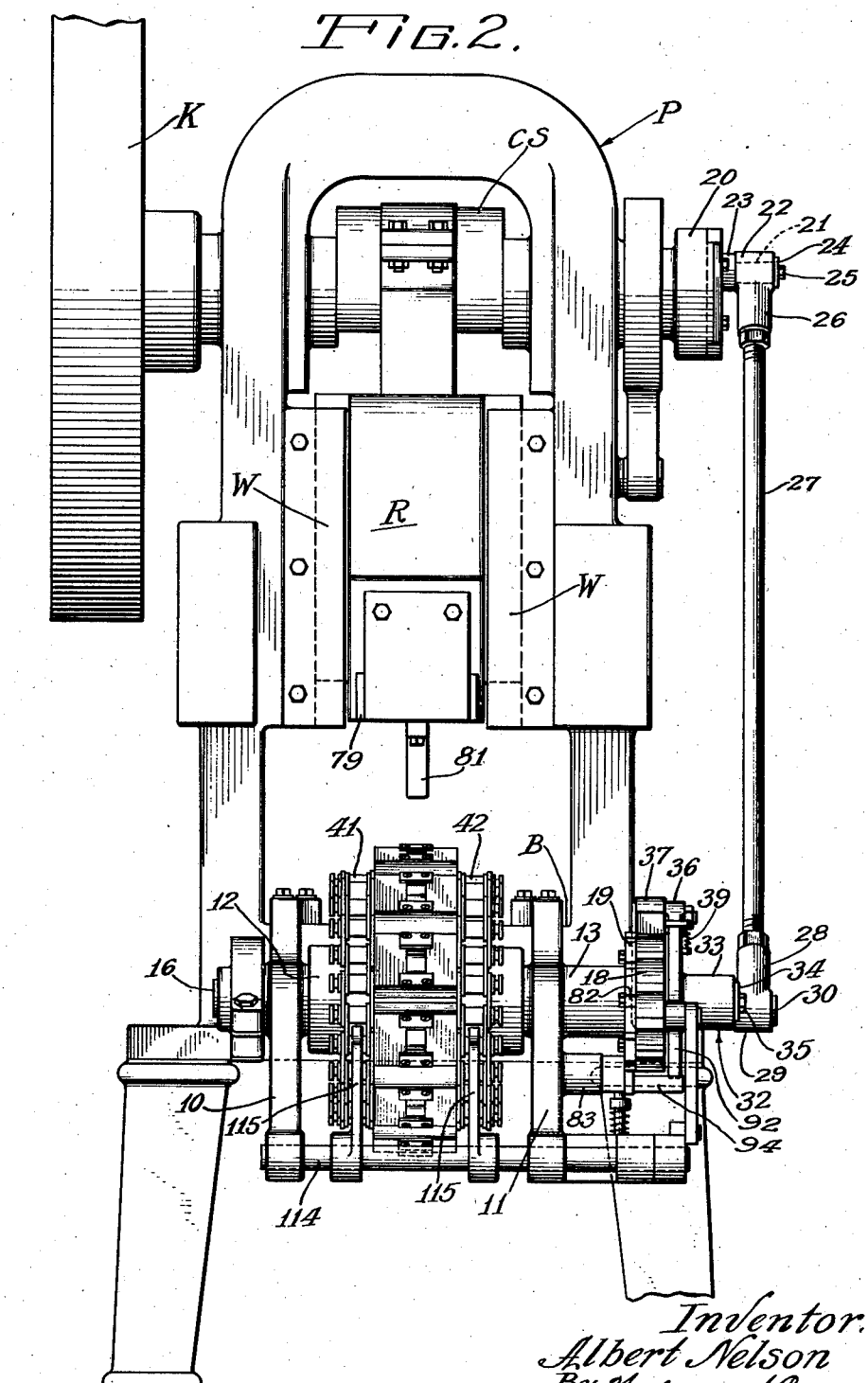
Fig. 2 is an elevational view looking in at the left-hand side of Fig. 1.

The new clenching apparatus includes novel means for removing the assembled and clenched brake shoe back and attaching lug units SL, one at a time, from the conveyor 52—53—54 at the unloading end thereof (left-hand end as seen in Figs. 1, 3 and 4). To this end a rock shaft 114 is journaled in the brackets 10 and 11 (Figs. 2 and 7) and fast on this shaft are a pair of spaced unloading or knock-off arms 115 which are positioned in substantial alignment with the sprockets 41 and 42 and the conveyor chains 52 and 53, respectively, which are movable therearound (Fig. 2). Fast upon the rock shaft 114, at one end thereof, is an arm 116 and this arm 116 is pivotally connected, as at 117, to a link 118 (Fig. 7). This link 118, in turn, is pivotally connected, as at 119, to an extension 120 of the rocker arm 31 which is arranged upon the shaft 16, as shown in Fig. 7.

When the conveyor 52—53—54 completes a cycle of operations and is in its fully at rest position, the unloading or knock-off arms 115 are disposed in the position in which they are shown in Fig. 4, that is to say, they are disposed inwardly or behind one of the assembled and clenched back and lug units SL. However, as and when the link 27 is lowered by operation of the crank shaft CS and the parts 20 to 26, inclusive, shown in Fig. 2, associated therewith, and as an incident to moving the pawl-supporting arm 36 and the advancing pawl 37 carried thereby into their retracted position, as shown in Fig. 7, the motion thus imparted by the link 27 to the rocker arm 31 operates to rotate the rocker arm 31 clockwise into the position in which it is shown in Fig. 7. This movement of the rocker arm 31 raises the extension 120 thereof and the link 118 and the arm 116 into the position in which these parts are shown in Fig. 7. This movement of the parts rotates the shaft 114 in a counter-clockwise direction, as seen in Fig. 4, thereby moving the knock-off or unloading arms 115 from the position in which they are shown in Fig. 4 into the position in which they are shown in Fig. 7. During this operation the knock-off or unloading arms 115 engage the assembled and clenched back and the lug unit SL carried by the adjacent carrier block 54 and force the same off from its carrier block 54, whereupon the thus unloaded clenched back and lug unit SL may be allowed to fall by gravity onto a conveyor or into a suitable receptacle provided therefor at the unloading end of the conveyor (left-hand end as seen in Figs. 1, 4 and 7).

It will be noted, in this connection, that as soon as the knock-off or unloading arms 115 have thus dislodged one of the assembled and clenched back and lug units SL from the adjacent carrier block 54, as aforesaid, the knock-off or unloading arms 115 are moved back into their initial position, as in Fig. 4, ready to engage the assembled back and lug unit BL carried by the next succeeding carrier block 54 on the conveyor. This movement of the knock-off or unloading arms 115 is effected just prior to the time that the next succeeding carrier block 54 and the back and lug unit SL carried thereby are moved into position opposite the upper ends of the knock-off or unloading arms 115, as in Fig. 4, this being accomplished as follows: As the link 27 commences its upward movement, incidental to advancing the ratchet 18 and shaft 16 in a counter-clockwise direction, as seen in Fig. 7, under control of the pawl 37, the movement thus imparted by the link 27 to the rocker arm 31 moves the extension 120 of the rocker arm 31 in a counter-clockwise direction from the position in which it is shown in Fig. 7. This movement of the extension 120 of the rocker arm 31 acts, through the link 118 and the arm 116 to rock the shaft 114 in a clockwise direction, as seen in Fig. 7, thereby moving the unloading arms 115 from the position in which they are shown in Fig. 7 back into their initial position, as shown in Fig. 4. Thus the knock-off or unloading arms 115 are returned to their initial position just prior to the time the aforesaid movement of the link 27, rocker arm 31, arm 36, pawl 37, ratchet 18 and shaft 16 operate to effect the next step-by-step advancing movement of the conveyor and which advancing movement of the conveyor advances the next succeeding carrier block 54 and the assembled and clenched back and lug unit SL carried thereby into a position opposite the upper ends of the unloading arms 115.

It will thus be seen that in the use and operation of the new clenching apparatus described hereinabove, the attaching lugs L may be removed from the supporting table 112 and successively placed in the pockets 107—108 in the carrier blocks 54 on the conveyor 52—53—54 with the bight portion 109 of each attaching lug L resting upon the bottom wall of the pocket liner 108 and with the upper end portions of the legs of each lug projecting upwardly above the mouth of the pocket. The brake shoe backs S may then be removed from the table 113 and placed upon the carrier blocks 54 with the convex surface of each brake shoe back S disposed downwardly and with the upper end portions or tongues of the legs of one of the lugs L projecting through medially arranged spaced openings provided for the reception thereof in each of the backs S.

Accordingly, rotation of the power transmission member K and crank shaft CS acts, through the crank disc 20 and associated parts 21 to 26, inclusive, to lower the link 27, thereby moving the link 27 and the rocker arm 31 into the position in which these parts are shown in Fig. 7. This movement of the rocker arm 31 acts through pawl-supporting arm 36 to retract the pawl 37 into its initial position, as shown in Fig. 7. The link 27 is then moved upwardly and this motion of the link 27 acts, through the rocker arm 31, and the pawl-supporting arm 36 and the pawl 37, to rotate the ratchet 18 and the shaft 16 one circumferential step in a counter-clockwise direction, as seen in Fig. 7. This movement of the shaft 16 acts, through the sprockets 41 and 42, to advance the conveyor chains 52—53 and the carrier blocks 54 carried thereby one step, thereby advancing one of the carrier blocks 54 and assembled but unclenched back B and lug L unit carried thereby over the anvil 76 and into a position under the first clamping element 80.

As the assembled but unclenched back and lug SL are thus moved into position under the first clenching element 80, the cam surface 93 of the arm 92 rides off the stud 94 carried by the rocker 85. The spring 90 thereupon urges the rocker 85 in a direction to dispose the tooth 91 thereof in one of the notches 82 in the notched plate 19 thereby positively stopping the advancing movement of the conveyor and accurately positioning the assembled but unclenched back S and lug L under the first clenching element 80.

It will be recalled, in this connection, that the advancing movement of the conveyor 52—53—54 is restrained under the frictional drag of the brake assembly shown in Fig. 9 so as effectively to dissipate the momentum of the advancing conveyor prior to the time the tooth 91 seats in one of the notches 82 in the notched disc 19, thereby eliminating the stress which would otherwise be exerted upon the parts, and assuring accurate positioning of the parts to be assembled under the clenching elements 80 and 81.

It will also be recalled that the arrangement of the crank mechanism 20—21 and associated parts shown in Figs. 1 and 2 is such that the link 27, rocker 31, arm 36, pawl 37, ratchet 18, shaft 16, and sprockets 41 and 42 operate to accelerate the conveyor rather slowly during the first part of each advancing movement thereof and that the conveyor is decelerating when the advancing movements thereof are arrested by the engagement of the tooth 91 in one of the notches 82 in the notched disc 91.

As the assembled back S and lug L are thus moved under the first clenching lug 80, the operation of the crank shaft CS acts to lower the ram R in the ways W of the press P. This downward movement of the ram R lowers the plate 79 and the clenching elements 80 and 81 carried thereby and this downward movement of the first clenching element 80 causes the upwardly curved bottom surface 121 thereof to engage the arms of the lug L disposed therebelow and thereby bend the same toward each other into the position in which they are shown in Fig. 4.

Further rotation of the crank shaft CS then acts to raise the ram R and the plate 79 and the clenching elements 80 and 81 carried thereby and as the clenching elements 80 and 81 are thus raised the cam surface 93 of the arm 92 rides back into the stud 94 carried by the rocker 85, thereby forcing the tooth 91 on the rocker 85, against the action of the spring 90, and of latching engagements in one of the notches 82 in the notched plate 19, thus releasing the conveyor 52—53—54 for further advancing movement. Another advancing movement or step is thereupon imparted to the conveyor 52—53—54 through the medium of the crank shaft CS, crank 20 and associated parts 21 to 26, inclusive, link 27, and associated parts 28—29—30, rocker 31—32, pawl-supporting arm 36, pawl 37, ratchet 18, shaft 16 and sprockets 41 and 42, thereby moving the previously partially clenched lug L and its associated back S from position under the first clenching element 80 into position under the second clenching element 81 while, at the same time, another back S and lug L assembly are moved into position under the first clenching element 80.

At this time the cam surface 93 of the arm 92 again rides off the stud 94 on the rocker 85 whereupon the spring 90 urges the rocker 85 in a direction to engage the tooth 91 thereof in one of the notches 82 in the notched plate 19, positively stopping the advancing movement of the conveyor 52—53—54 and accurately positioning an assembled and partially clenched back and lug units where the second clenching element 81 which is the same time accurately positioning the next succeeding but unclenched back and lug assembly under the first clenching element 80. The ram R, plate 79 and clenching elements 80 and 81 are then again lowered and during this downward movement of these parts the clenching element 81 engages the previously partially clenched lug L disposed therebelow and completes the clenching thereof by forcing the partially bent over upper ends of the arms or lug L down the concave upper surface of the back S associated therewith, thus completing the clenching operation.

Further step-by-step operation of the conveyor 52—53—54 successively advances each of the assembled and clenched back and lug units SL toward the unloading end of the conveyor (left-hand end as seen in Figs. 1, 3, 4 and 7) whereupon the assembled and clenched back and lug units SL are mechanically ejected or dislodged from the conveyor one at a time by means of the knock-off or unloading arms 115 which operate in timed relation with the step-by-step advancing movement of the conveyor, and under control of the extension 120 of the rocker arm 31, link 118, arm 116 and rock shaft 114, in the manner hereinbefore described.

The embodiment of the invention illustrated in Figs. 10 to 18, inclusive, is in many respects substantially like the apparatus described in detail hereinabove and like numerals are used to identify corresponding parts. The apparatus shown in Figs. 10 to 18, however, includes a carrier chain having separable base blocks and carrier or die blocks that are so constructed and related as to adapt the machine for the assembly of the lugs L to driver shoe backs DS (Figs. 16–17) which are generally similar to the regular backs S but, because of the heavy duty required of the brakes and brake shoes on the driver wheels of a locomotive or the like, the driver shoe backs DS are larger and of a different configuration so that they are more difficult to handle. It is intended, however, that the carrier chain utilized to enable the apparatus to handle and advance driver shoe back assemblies DSL be easily conditioned to accommodate regular back assemblies SL, and for this reason, a construction is provided whereby die blocks for either type of shoe back assemblies DSL or SL may be easily and quickly attached to or removed from the carrier chain of the apparatus.

Thus, as best shown in Figs. 16, 17 and 18, the carrier chain includes base blocks 122 which are secured in position between the chains 52 and 53 in the same manner as the die-blocks 54 of the previously described apparatus, as by the shanks 57 and 58 of link pins 59 and 60. Each base block is rectangular in shape and of sufficient length to extend between the chains 52 and 53, and each is formed with a shallow recess 123 in its top face, co-extensive with its length. One longitudinal edge of each base block 122 has a lateral flange 124 lying in the plane of the top face thereof and terminating close to the adjacent base block so as to thereby provide a substantially flat top surface on the carrier chain assembly.

Each of the base blocks 122 has a carrier or die block 125 resting snugly in the shallow recess 123, and these carrier blocks are secured to the base blocks preferably by a plurality of screws 126. Each block 122 has a central opening 127 providing a pocket to receive one of the U-shaped lugs L. A liner plate 128 of hardened metal is fitted into the bottom of the die block 125 so as to provide a pressure resisting floor for the pocket 127 for a purpose to become apparent as the description proceeds. Upon reference to Fig. 16, it will be noted that the lugs L rest snugly within the pockets 127 with their bight portion resting firmly upon the liner plate 128 and that their leg portions extend upwardly above the top face of the carrier block in which they are mounted. Driver shoe backs DS are arranged, as in the previously described apparatus, one over each carrier block 125 in such position that the tongues on the upstanding legs of the related lugs L extend through openings in said driver shoe back in the manner illustrated at the right-hand end of Fig. 16. The driver shoe backs DS are, in this instance, formed with a longitudinal extension E, substantially arcuate in cross-section, which is of such dimension as to have its curved bottom face resting firmly upon the lip 124 of the base block 125 on which it is mounted, thus effecting a firm support for said driver shoe back DS prior to final clenching which is accomplished in a manner to be described hereinafter.

It will thus be seen that as a step-by-step movement is imparted to the conveyor 52—53—122 in the manner as described hereinabove, each carrier block 125, and the assembled but unclenched shoe back DS and lug L carried thereby, are moved into a fully at rest position upon the press anvil 76 under a first clenching element 129. The press ram R, shown in the Fig. 4 disclosure of the previously described embodiment, is thereupon lowered, thus forcing the first clenching element 129 downwardly into engagement with the upwardly projecting tongues of the lug L disposed therebelow. Inasmuch as the lower end 130 of the clenching element 129 is formed substantially convex outwardly, this action bends the tongues of the lug L disposed therebelow outwardly away from each other as shown in Fig. 16. Continued operation of the apparatus causes the ram of the press and the clenching element 129 carried thereby to be raised, whereupon the carrier chain advances another step, thereby moving the partly clenched lug L across the anvil 76 from its position under the clenching element 129 into a fully at rest position under a second clenching element 131 carried on the ram of the press. When the ram is again lowered, the second clenching element 131 engages the partly bent over tongues of the lug L disposed therebelow and causes the clenching of these tongues upon the driver shoe back DS assembled therewith by forcing these tongues outwardly and downwardly into fully clenched position, thus completing the clenching operation and the accurate assembly of the driver brake shoe back DS and its attaching lug L.

The clenching apparatus of this embodiment of the invention also includes unloading of knock-off mechanism similar to that forming a part of the previously described apparatus. As shown in Fig. 10, this apparatus includes a rock shaft 114A which is journaled in brackets 132 (only one being shown), and fast on this shaft are a pair (only one shown) of transversely spaced unloading or knock-off arms 115A. Fast upon the rock shaft 114A at one end thereof is an arm 116A and the free end of this arm is pivotally connected to a link 118A. This link 118A in turn is pivotally connected to an extension 120A on the rocker arm 31 which is arranged upon the sprocket shaft 16 in the manner previously described hereinabove.

The present arrangement, however, is so located with respect to the discharge end of the carrier chain apparatus that the forward or free ends of the knock-off arms 115A are disposed to co-act with a driver shoe back and lug assembly DSL at an at rest position of the carrier which is one position further advanced than the rest position in which the knock-off arms 115 of the previously described apparatus so engaged such brake shoe backs. This variance in the effective location of the knock-off arms is desirable because of the greater weight of the driver shoe back and lug assemblies DSL, as compared to assemblies SL, since in some instances such assemblies may require a more vertical line of discharge than the lighter assemblies to avoid binding of the lugs L in the recesses of the carrier blocks. Inadvertent discharge or separation of a driver shoe back and lug assembly from the carrier blocks in which they are carried while the carrier chain is moving downwardly around the discharge end of the machine, and prior to their being ejected by the knock-off arms, may be effectively prevented by arranging guide or retaining tracks 133 which are secured to the frame of the apparatus, one in alignment with each chain 52—53 and disposed outwardly thereover as shown in Fig. 10.

The apparatus of Fig. 10 also includes novel means in the form of an elevator conveyor for receiving the driver shoe back and lug assemblies DSL as they are discharged or knocked off of the carrier conveyor and for advancing said assemblies in a step-by-step movement into an elevated position to facilitate their being picked up by workmen or conveyed from the machine in any suitable or conventional manner. In the present exemplification of the invention, this apparatus includes brackets 134 and 135 which are bolted or otherwise suitably secured to a base plate 136 resting on the floor or other support for the bed B of the press P and extending outwardly from the discharge end of the carrier apparatus. Bearing housings 137 and 138 (Fig. 13) are respectively provided in the brackets 134 and 135, and in which a shaft 139 is journaled.

The shaft 139 has a pair of sprockets 140 mounted thereon, one inwardly of each of the bearing housings and secured against movement therefrom by suitable collars 141, which collars serve also to prevent transverse shifting of the shaft 139 in its bearing housings 137 and 138. The shaft has an end extending beyond the bearing housing 137 upon which is freely mounted a sleeve 142 having an arm 143 pivotally connected as by a journal pin 144 to one end of a link 145, the other end of which is pivotally connected by a journal pin 146 to a lever 147 depending from a sleeve 148 carried on the shaft 114A and from which the arm 116A extends. It will thus be observed that when rocking motion is imparted to the knock-off arms 115A upon reciprocation of the link 118A during operation of the apparatus, a reciprocating rotary movement is imparted to the sleeve 142 on the shaft 139. A second arm 149 extends outwardly from the sleeve 148 on the shaft 139, which arm is pivotally connected at its free end as at 151 to a link 152 which extends forwardly and upwardly of the conveyor apparatus and has its forward end pivotally connected, as at 153, to an arm 154 carried by a sleeve 155 mounted for free rotation on a shaft 156.

The shaft 156 is journaled in bearing brackets 157 mounted upon the upper end of a built-up standard 158 carried on the base plate 136 and spaced a substantial distance from the brackets 134 and 135. The shaft 156 also carries a pair of sprockets 140A in alignment respectively with sprockets 140 on the lower shaft 139; and a pair of endless link chains 160 are trained respectively over and about the pairs of aligned sprockets 140 and 140A. Upon reference to Fig. 10 it will be noted that the lower or rear end of the elevator apparatus is located with respect to the discharge end of the carrier apparatus in such position that the brake shoe back and lug assemblies DSL discharged from the carrier will drop into cooperating relationship with the elevator chains 160.

Step-by-step movement is imparted to the chains 160 through positive rotation of the shaft 156 so as to advance the brake shoe assemblies in an angularly upward direction toward the upper end of the elevator apparatus. To this end, as shown in Fig. 12, the shaft 156 extends outwardly beyond one of the brackets 157 and has a ratchet 161 firmly secured thereto closely adjacent to said bracket. The sleeve 155, which is mounted for free rotation on the shaft 156 outwardly of the ratchet 161, has an arm 162 extending from one side thereof which carries a pin 163 upon which a pawl 164 is mounted in registering alignment with the peripheral face of the ratchet 161. The pawl 164 is normally held against the face of the ratchet by a spring 165, Fig. 10. It will be evident that upon reciprocating rocking movement of the arm 149 on the lower shaft 139, a rocking motion is imparted to the sleeve 155 through arm 154 and link 152 so as to move the pawl 164 forwardly and then rearwardly across the face of the ratchet 161.

In operation, the movement of the pawl 164 is such that it is moved rearwardly in a direction so as to be ineffective to rotate the ratchet 161 at a time when the knock-off arms 115A are effective to knock off a brake shoe back assembly DSL from the carrier conveyor and downwardly onto the elevator conveyor. As soon as the knock-off arms 115A return to their initial position, during continued operation of the apparatus, the pawl 164 is advanced in a forwardly direction so as to thereby engage one of the teeth on the ratchet 161 and effect positive forward rotation of said ratchet and consequently a like amount of rotation of the shaft 156 upon which it is mounted so as to thereby advance the chains 160 a distance proportional to but somewhat greater than the distance to which the pawl 164 was advanced. It will be apparent also that each time an assembly DSL is knocked off of the carrier conveyor, the assembly knocked therefrom during a previous operation of the knock-off arms 115A has been carried out from beneath the arms 115A so that the shoe assembly in the process of being knocked off may drop onto the elevator conveyor rearwardly of the preceding assembly.

Positive movement of the brake shoe assemblies in an upwardly direction on the elevator chains 160 is insured by fitting each of said chains with a plurality of lugs spaced therealong a distance equal to the distance the chains travel during each cycle of their step-by-step advancing movement. As best shown in Fig. 14, each of these lugs consists of a short channel section 166 which is riveted or otherwise secured to a short extension 167 provided on selected links of the chains 160.

Inasmuch as the weight of the brake shoe back and lug assemblies DSL is considerable, additional supporting means is provided in the form of supporting guides 168 (Figs. 10, 11 and 14) coextensive with the length of the upper flight or run of each chain 160, having laterally projecting rails 169 extended therefrom so as to underlie said upper flights and carry the weight of the chains. Thus the upper runs of the chains 160 are supported so as to move in a straight path, and the upper surfaces of the guides 168 are so formed that the assemblies DSL rest slidably upon such upper surfaces and are out of contact with the chains 160 at all times. The arrangement is such, however, that the lugs 166 extend above the guides 168 so as to engage the rear surfaces or edges of the assemblies DSL and slide the same upwardly along the guides 168 as the advancing movement of the chains 160 progresses. The guides 168 are secured in place at their respective ends to brackets 134—135 and 157, respectively, as by bolts 170 and 171, respectively, and terminate at their upper ends in forwardly extending guide portions 172 which slightly overhang the top face of a receiving platform 173 rigidly mounted upon angles 174 secured at one end to the brackets 157 and adjacent their other ends to the upper ends of braces 175 rigidly secured to the standard 158. Excessive looseness in the chains 160 is effectively avoided by providing a take-up sprocket 176 to co-act with the return flight or run of said chains, which sprocket is carried on the free end of an arm 177 journaled or otherwise pivotally mounted in brackets 178 as at 179.

In the course of step-by-step operation of the chains 160, said chains are moved at a progressively increasing rate of speed in the same manner and at the same rate as the carrier chains 52 and 53, which rate of speed progressively diminishes as the end of the movement is approached. It is, of course, necessary to provide means to prevent a reverse movement of the chains 160 during an at rest period in the course of machine operation. Hence, a braking arrangement is associated with the shaft 156 so as to retard the reverse rotation of the shaft 156 during the stopping operation. A suitable braking arrangement is best shown in Figs. 12 and 15 which includes a brake disc 180 mounted on the shaft 156 and what is in effect an external brake drum 181 disposed about the periphery of said brake disc. The brake drum includes a lug 182 that is pivotally mounted on the outer face of one of the brackets 157 carried on one of the standards 158. The brake drum also includes two circular surfaces 183—184 on which blocks of suitable friction material 185 are mounted and the brake drum has a slot 186 extended into the lug 182. Another slot 187 is provided therein in diametrical opposition to the slot 186. This slot 187 extends through bosses 188 and 189 provided on the brake drum and a bolt 190 is freely extended through an opening in the boss 189 and is screw threaded into an opening in the boss 188. By adjusting the position of the bolt 190 relative to the bosses 188—189, the force with which the blocks of friction material 185 are applied to the periphery of the brake disc 180 may be adjusted. This arrangement affords a very effective means to retard reverse rotation of the shaft 156 and the chains 160 during an at rest period.

As described hereinbefore, the embodiment of the invention, as illustrated in Figs. 10 to 18, and particularly the construction of the carrier blocks 125, is adapted primarily to accommodate driver brake shoe back and lug assemblies DSL. It is, however, also capable of being readily changed over to accommodate brake shoe back and lug assemblies SL of the kind illustrated in connection with the disclosure of the apparatus as shown in Figs. 1 to 9, inclusive. Accordingly, Figs. 19 and 20 disclose an arrangement of a carrier conveyor provided with a modified form of carrier blocks 125A which are substantially like carrier blocks 125 shown in Fig. 16 except that in this instance, each is provided with a substantially rectangular pocket 127A to receive a lug L, of the kind used on the brake shoe back assemblies SL during the feeding and assembling operation. Each carrier block 125A is, like that previously described, secured in the recess 123 in top face of a base block 122 by means of bolts 126 so as to be readily removable for interchange of carrier blocks. In other respects, the disclosure of Figs. 19 and 20 is like the previously described disclosure of Figs. 16 and 17 and like numerals identify corresponding parts. Thus, when the machine is to be used for the production of back assemblies SL, it is merely necessary to put the carrier blocks 125A in position on the various base blocks 122, and to mount the forming elements 80 and 81 on the ram of the press.

It will thus be seen from the foregoing description, considered in conjunction with the accompanying drawings, that the present invention accomplishes its intended objects and has the desirable advantages and characteristics including those hereinbefore specifically pointed out and others which are inherent in the invention.

I claim:

1. In an apparatus of the class described, a reciprocating element, a conveyor for advancing parts to be clenched one onto the other into operative relation with said reciprocating element, driving means for said reciprocating element and said conveyor and operative to impart a step-by-step movement to said conveyor and to advance said reciprocating element toward said conveyor and parts carried thereby during an at rest interval in the step-by-step advancing of said conveyor, stop means for positively arresting movement of said conveyor at the end of each advancing movement thereof to thereby dispose parts on said conveyor in predetermined relation with said reciprocating element, means for dissipating the momentum of said conveyor to relieve the stress impressed on said stop means upon the functioning thereof, and a pair of spaced clenching members carried by said reciprocating element, one of said clenching members having a curved clenching surface adapted to initiate and to effect a partial clenching operation upon said parts at the end of an advancing movement of said conveyor and the other of said clenching members having a relatively flat clenching surface adapted to complete the clenching operation upon said previously partially clenched parts at the completion of the next succeeding advancing movement of said conveyor.

2. In an apparatus for clenching a U-shaped attaching lug to a brake shoe back having spaced medially arranged openings provided therein for the reception of the legs of one of said attaching lugs, the combination of a reciprocating member having a pair of spaced clenching elements thereon, means for operating said reciprocating and said spaced clenching elements carried thereby, a conveyor including a series of interconnected carrier blocks each having a pocket therein adapted to receive a portion of one of said attaching lugs with the bight portion of said attaching lug resting upon the bottom of the pocket and with the upper end portions of the legs of said attaching lug projecting upwardly above the mouth of the pocket and through said spaced medially arranged openings in one of said brake shoe backs disposed upon said carrier block, means for imparting a step-by-step advancing movement to said conveyor so as to advance said carrier blocks and the assembled brake shoe backs and attaching lugs carried thereby sequentially into aligned relationship with said clenching elements, one of said clenching elements being adapted to initiate the clenching of the upwardly projecting end portions of the legs of each of said attaching lugs upon the brake shoe back assembled therewith and to effect a partial clenching thereof at the end of an advancing movement of said conveyor, and the other of said clenching elements being adapted to complete the operation of clenching said previously partially clenched attaching lug upon the brake shoe back assembled therewith at the end of the next succeeding advancing movement of said conveyor.

3. An apparatus as defined in claim 2 which includes stop means for positively arresting movement of said conveyor at the end of each advancing movement thereof so as to dispose one of said carrier blocks and a brake shoe back and attaching lug assembly carried thereby in a predetermined relationship with each of said clenching elements so as to assure proper positioning and clenching of each of said attaching lugs upon the brake shoe back assembled therewith.

4. An apparatus as defined in claim 2 which includes stop means for positively arresting movement of said conveyor at the end of each step-by-step advancing movement thereof so as to dispose one of said carrier blocks and a brake shoe back and attaching lug assembly carried thereby in a predetermined relationship with each of said clenching elements so as to assure proper positioning and clenching of each of said attaching lugs upon the brake shoe back assembled therewith, and in which said apparatus includes means for decelerating the motion of said conveyor during the latter part of each advancing movement thereof.

5. An apparatus as defined in claim 2 which includes stop means for positively arresting movement of said conveyor at the end of each advancing movement thereof so as to dispose one of said carrier blocks and a brake shoe back and attaching lug assembly carried thereby in a predetermined relationship with each of said clenching elements, in which said apparatus includes means operating in timed relationship with said conveyor advancing means for sequentially and automatically ejecting said completely clenched brake shoe back and attaching lug assemblies off from the said carrier blocks subsequent to the completion of the clenching operation and as an incident to each step-by-step advancing movement of said conveyor.

6. In an apparatus of the character described, the combination of vertically reciprocatory lug clenching means, a horizontally extending bearing surface disposed below said reciprocatory clenching means, a horizontally extending conveyor including an endless chain of carrier members each adapted to support a plurality of assembled parts to be clenched together by said vertically reciprocatory clenching means, operating mechanism including means for imparting vertically reciprocatory movements to said reciprocatory clenching means and means for imparting a step-by-step horizontal advancing movement to said conveyor in timed relationship with the reciprocatory movement of said clenching means so as to move each of said carrier members and the assembled parts to be clenched carried thereby successively over said bearing surface and into clenching relationship with said reciprocatory clenching means.

7. An apparatus as defined in claim 6 which includes means for positionally and automatically arresting movement of the conveyor at the end of each advancing movement thereof so as to assure accurate positioning of the assembled parts to be clenched carried by each of said carrier members under said reciprocatory clenching means.

8. An apparatus as defined in claim 6 which includes means for positionally and automatically arresting movement of the conveyor at the end of each advancing movement thereof so as to assure accurate positioning of the assembled parts to be clenched carried by each of said carrier members under said reciprocatory clenching means, and in which said apparatus includes means for dissipating the momentum of said conveyor to relieve the stress impressed upon said arresting means upon the functioning thereof.

9. An apparatus as defined in claim 6 which includes means for positionally and automatically arresting movement of the conveyor at the end of each advancing movement thereof so as to assure accurate positioning of the assembled parts to be clenched carried by each of said carrier members under said reciprocatory clenching means, and in which said apparatus includes means for decelerating the movement of said conveyor during the latter part of each step-by-step advancing movement thereof.

10. In an apparatus of the class described, a reciprocating element, a conveyor for advancing parts to be clenched one onto the other into operative relation with said element, driving means for said reciprocating element and said conveyor and operative to impart a step-by-step movement to said conveyor and to advance said reciprocating element toward said conveyor and parts carried thereby during an at rest interval in the step-by-step advancing of the conveyor, means on said reciprocating element for clenching together parts disposed in said predetermined relation with said reciprocating element upon movement of said reciprocating element toward said parts, means for mechanically and automatically ejecting said clenched parts from said conveyor, and elevator means to receive and convey said ejected parts away from the conveyor, said elevator means being operatively connected with the driving means for a step-by-step movement.

11. An apparatus of the character described in claim 10 and in which said elevator means includes a pair of endless chains having lugs spaced therealong to engage the ejected parts, and in which means is provided coextensive with the effective flight of said endless chains to carry the weight of said ejected parts and thereby relieve the chains of such weight.

12. An apparatus of the character described in claim 10 and in which said elevator means includes a pair of endless chains having lugs spaced therealong to engage the ejected parts and in which means is provided coextensive with the effective flight of said endless chains to carry the weight of said ejected parts and thereby relieve the chains of such weight, and in which means is provided for positively and automatically arresting movement of the endless chains at the end of each advancing movement thereof.

13. In an apparatus of the class described, a reciprocating element, a conveyor for advancing parts to be clenched one onto the other into operative relation with said reciprocating element, driving means for said reciprocating element and said conveyor and operative to impart a step-by-step movement to said conveyor and to advance said reciprocating element toward said conveyor and parts carried thereby during an at rest interval in the step-by-step advancing of said conveyor, stop means for positively arresting movement of said conveyor at the end of each advancing movement thereof to thereby dispose parts on said conveyor in predetermined relation with said reciprocating element, means for dissipating the momentum of said conveyor to relieve the stress impressed on said stop means upon the functioning thereof, and means on said reciprocating element for clenching together parts disposed in said predetermined relation with said reciprocating element upon movement of said element toward said parts, said apparatus including an anvil disposed below said clenching means and said conveyor including a series of interconnected carrier blocks movable over said anvil under said clenching means and each having successively a pocket therein for the reception of portions of one of the parts to be clenched to another part one of which is carried by each of the said carrier blocks.

14. In an apparatus of the class described, a reciprocating element, a conveyor for advancing parts to be clenched one onto the other into operative relation with said reciprocating element, driving means for said reciprocating element and said conveyor and operative to impart a step-by-step movement to said conveyor and to advance said reciprocating element toward said conveyor and parts carried thereby during an at rest interval in the step-by-step advancing of said conveyor, stop means for positively arresting movement of said conveyor at the end of each advancing movement thereof to thereby dispose parts on said conveyor in predetermined relation with said reciprocating element, means for dissipating the momentum of said conveyor to relieve the stress impressed on said stop means upon the functioning thereof, and means on said reciprocating element for clenching together parts disposed in said predetermined relation with said reciprocating element upon movement of said element toward said parts, said conveyor including a series of interconnected carrier blocks each having a pocket therein for the reception of a U-shaped brake shoe back attaching lug with the upper end portions of the legs of each of said attaching lugs projecting upwardly above the mouth of said pocket, and each of said carrier blocks being adapted to support a metallic brake shoe back having spaced medially arranged openings provided therein for the reception of the upper end portions of the legs of one of said attaching lugs.

15. In an apparatus of the class described, a reciprocating element, a conveyor for advancing parts to be clenched one onto the other into operative relation with said reciprocating element, driving means for said reciprocating element and said conveyor and operative to impart a step-by-step movement to said conveyor and to advance said reciprocating element toward said conveyor and parts carried thereby during an at rest interval in the step-by-step advancing of said conveyor, stop means for positively arresting movement of said conveyor at the end of each advancing movement thereof to thereby dispose parts on said conveyor in predetermined relation with said reciprocating element, means for dissipating the momentum of said conveyor to relieve the stress impressed on said stop means upon the functioning thereof, and means on said reciprocating element for clenching together parts disposed in said predetermined relation with said reciprocating element upon movement of said element toward said parts, said conveyor including a series of interconnected carrier blocks each having a pocket therein for the reception of a U-shaped brake shoe attaching lug with the upper end portions of the legs of each of said attaching lugs projecting upwardly above the mouth of said pocket, and each of said carrier blocks being adapted to support a metallic brake shoe back having spaced medially arranged openings provided therein for the reception of the upper end portions of the legs of one of said attaching lugs, said apparatus including a pair of spaced clenching members carried by said reciprocating element and said clenching apparatus including an anvil disposed below said clenching members and over which said carrier blocks are movable successively into position below said clenching members, and one of said clenching members having a curved clenching surface adapted to initiate and to effect a partial clenching operation upon the upwardly projecting leg portions of each of said attaching lugs at the end of an advancing movement of said conveyor, and the other of said clenching members having a relatively flat clenching surface adapted to complete the clenching operation upon the previously partially clenched legs of each of said attaching lugs at the completion of the next succeeding advancing movement of said conveyor.

16. In an apparatus of the class described, a reciprocating element, a conveyor for advancing parts to be clenched one onto the other into operative relation with said reciprocating element, driving means for said reciprocating element and said conveyor and operative to impart a step-by-step movement to said conveyor and to advance said reciprocating element toward said conveyor and parts carried thereby during an at rest interval in the step-by-step advancing of said conveyor, stop means for positively arresting movement of said conveyor at the end of each advancing movement thereof to thereby dispose parts on said conveyor in predetermined relation with said reciprocating element, means for dissipating the momentum of said conveyor to relieve the stress impressed on said stop means upon the functioning thereof, and means on said reciprocating element for clenching together parts disposed in said predetermined relation with said reciprocating element upon movement of said element toward said parts, said conveyor including a series of interconnected carrier blocks each adapted to support a pair of parts to be clenched and each of said carrier blocks having a pocket therein for the reception of portions of one of said pair of parts to be clenched and each of said pockets having a liner removably fitted therein.

17. In an apparatus of the class described, a reciprocating element, a conveyor for advancing parts to be clenched one onto the other into operative relation with said reciprocating element, driving means for said reciprocating element and said conveyor and operative to impart a step-by-step movement to said conveyor and to advance said reciprocating element toward said conveyor and parts carried thereby during an at rest interval in the step-by-step advancing of said conveyor, stop means for positively arresting movement of said conveyor at the end of each advancing movement thereof to thereby dispose parts on said conveyor in predetermined relation with said reciprocating element, means for dissipating the momentum of said conveyor to relieve the stress impressed on said stop means upon the functioning thereof, and means on said reciprocating element for clenching together parts disposed in said predetermined relation with said reciprocating element upon movement of said element toward said parts, said conveyor including a series of interconnected carrier blocks each adapted to support a pair of parts to be clenched and each of said carrier blocks having a pocket therein for the reception of portions of one of said pair of parts to be clenched, each of said pockets having a liner removably fitted therein, and each of said carrier blocks having an opening formed therein extending from the inner end or bottom of the pocket therein to an outer surface of said carrier block for the reception of a tool for removing said liner from its pocket.

18. In an apparatus of the class described, a reciprocating element, a conveyor for advancing parts to be clenched one onto the other into operative relation with said reciprocating element, driving means for said reciprocating element and said conveyor and operative to impart a step-by-step movement to said conveyor and to advance said reciprocating element toward said conveyor and parts carried thereby during an at rest interval in the step-by-step advancing of said conveyor, stop means for positively arresting movement of said conveyor at the end of each advancing movement thereof to thereby dispose parts on said conveyor in predetermined relation with said reciprocating element, means for dissipating the momentum of said conveyor to relieve the stress impressed on said stop means upon the functioning thereof, and means on said reciprocating element for clenching together parts disposed in said predetermined relation with said reciprocating element upon movement of said element toward said parts, said conveyor including a series of interconnected carrier blocks each having a pocket therein for the reception of a portion of a U-shaped brake shoe attaching lug with the upper end portions of the legs of each of said attaching lugs projecting upwardly above the mouth of the pocket in which it is arranged and each of said carrier blocks being adapted to support a metallic brake shoe back having spaced medially arranged openings provided therein for the reception of the upper end portions of the legs of one of said attaching lugs, and said apparatus including means for mechanically and automatically ejecting assembled and clenched attaching lugs and brake shoe back units from said conveyor.

19. In an apparatus of the class described, a reciprocating element, a conveyor for advancing parts to be clenched one onto the other into operative relation with said reciprocating element, driving means for said reciprocating element and said conveyor and operative to impart a step-by-step movement to said conveyor and to advance said reciprocating element toward said conveyor and parts carried thereby during an at rest interval in the step-by-step advancing of said conveyor, stop means for positively arresting movement of said conveyor at the end of each advancing movement thereof to thereby dispose parts on said conveyor in predetermined relation with said reciprocating element, means for dissipating the momentum of said conveyor to relieve the stress impressed on said stop means upon the functioning thereof, and means on said reciprocating element for clenching together parts disposed in said predetermined relation with said reciprocating element upon movement of said element toward said parts, said conveyor including a series of interconnected base blocks each carrying a removable carrier block each adapted to support a pair of parts to be clenched together, and each of said carrier blocks having a pocket therein for the reception of portions of one of said pair of parts to be clenched.

ALBERT NELSON.